(12) United States Patent
Liu et al.

(10) Patent No.: US 8,977,704 B2
(45) Date of Patent: Mar. 10, 2015

(54) METHOD AND APPARATUS FOR FLEXIBLE CACHING OF DELIVERED MEDIA

(75) Inventors: Chenghao Liu, Tampere (FI); Miska Hannuksela, Ruutana (FI)

(73) Assignee: Nokia Corporation, Espoo (FI)

( * ) Notice: Subject to any disclaimer, the term of this patent is extended or adjusted under 35 U.S.C. 154(b) by 108 days.

(21) Appl. No.: 13/340,123

(22) Filed: Dec. 29, 2011

(65) Prior Publication Data
US 2013/0173737 A1 Jul. 4, 2013

(51) Int. Cl.
*G06F 15/167* (2006.01)

(52) U.S. Cl.
USPC .......................................... 709/213; 709/230

(58) Field of Classification Search
CPC .................................................... G06F 15/167
USPC .............. 709/213, 219, 221, 231, 203, 248; 348/723; 370/352
See application file for complete search history.

(56) References Cited

U.S. PATENT DOCUMENTS

| | | | |
|---|---|---|---|
| 8,370,452 B2 | 2/2013 | Harvell et al. | |
| 8,468,262 B2 | 6/2013 | Furbeck | |
| 8,516,074 B2 | 8/2013 | Courtemanche et al. | |
| 8,561,116 B2 | 10/2013 | Hasek | |
| 8,677,005 B2 | 3/2014 | Wang et al. | |
| 8,694,669 B2 | 4/2014 | Park et al. | |
| 8,717,890 B2 | 5/2014 | Kovvali et al. | |
| 8,782,268 B2 | 7/2014 | Pyle et al. | |
| 8,880,633 B2 | 11/2014 | Brookins et al. | |
| 8,909,805 B2 | 12/2014 | Thang et al. | |
| 8,925,021 B2 | 12/2014 | Ma et al. | |
| 2010/0169303 A1* | 7/2010 | Biderman et al. | 707/723 |
| 2010/0235472 A1 | 9/2010 | Sood et al. | |
| 2010/0235528 A1* | 9/2010 | Bocharov et al. | 709/231 |

(Continued)

FOREIGN PATENT DOCUMENTS

| | | |
|---|---|---|
| GB | 2481529 A | 12/2011 |
| WO | WO 2011/087449 A1 | 7/2011 |

(Continued)

OTHER PUBLICATIONS

3GPP TS 26.234 Release 9; "Transparent end-to-end packet-switched streaming service (PSS): protocols and codecs;" http://www.3gpp.org/ftp/Specs/html-info/26234.htm; date accessed Oct. 11, 2012.

(Continued)

*Primary Examiner* — Jason K. Gee
*Assistant Examiner* — Maung Lwin
(74) *Attorney, Agent, or Firm* — Alston & Bird LLP

(57) ABSTRACT

Various methods are described for selecting an access method for flexible caching in DASH. One example method may include causing a request for at least one of a primary representation for a segment or an alternative representation for the segment to be transmitted to a caching proxy. The method may further include causing the caching proxy to respond with at least one of the primary representation or the alternate representation based on the caching status at a caching proxy. The caching proxy may be configured to determine whether the request enables an alternative representation to be included in a response. Furthermore, the method may include receiving at least one of the primary representation and the alternative representation for the segment from the caching proxy. Similar and related example methods, apparatuses, and computer program products are also provided.

36 Claims, 13 Drawing Sheets

(56) References Cited

U.S. PATENT DOCUMENTS

| | | | |
|---|---|---|---|
| 2011/0119394 A1 | 5/2011 | Wang et al. | |
| 2011/0307545 A1* | 12/2011 | Bouazizi | 709/203 |
| 2012/0016965 A1* | 1/2012 | Chen et al. | 709/219 |
| 2012/0042050 A1* | 2/2012 | Chen et al. | 709/219 |
| 2012/0124179 A1* | 5/2012 | Cappio et al. | 709/219 |
| 2012/0166667 A1 | 6/2012 | Hall | |
| 2012/0216038 A1 | 8/2012 | Chen et al. | |
| 2012/0278495 A1 | 11/2012 | Furbeck | |
| 2012/0284371 A1* | 11/2012 | Begen et al. | 709/219 |
| 2012/0290644 A1 | 11/2012 | Gabin et al. | |
| 2013/0103849 A1 | 4/2013 | Mao et al. | |
| 2013/0182643 A1 | 7/2013 | Pazos et al. | |
| 2013/0254418 A1 | 9/2013 | Shaobo Zhang | |
| 2013/0290493 A1 | 10/2013 | Oyman et al. | |
| 2013/0291040 A1 | 10/2013 | Rhyu et al. | |
| 2013/0298170 A1 | 11/2013 | ElArabawy et al. | |
| 2014/0032777 A1 | 1/2014 | Yuan et al. | |
| 2014/0089518 A1 | 3/2014 | Zhang et al. | |
| 2014/0115647 A1 | 4/2014 | Kim et al. | |
| 2014/0153504 A1 | 6/2014 | Wang et al. | |
| 2014/0219088 A1 | 8/2014 | Oyman et al. | |
| 2014/0245359 A1 | 8/2014 | De Foy et al. | |
| 2014/0258552 A1 | 9/2014 | Oyman et al. | |
| 2014/0317234 A1 | 10/2014 | Mueller et al. | |
| 2014/0380113 A1 | 12/2014 | Luby et al. | |

FOREIGN PATENT DOCUMENTS

| | | | | |
|---|---|---|---|---|
| WO | WO 2011087449 A1 * | 7/2011 | | H04L 29/06 |
| WO | WO-2011090715 | 7/2011 | | |

OTHER PUBLICATIONS

3GPP TS 26.247 Release 10; "Transparent end-to end packet-switched streaming service (PSS): Progressive download and dynamic adaptive Streaming over HTTP (3GP-DASH)" http://www.3gpp.org/ftp/Specs/html-info/26247.htm; date accessed Oct. 11, 2012.

Adobe; "HTTP dynamic streaming on the Adobe flash platform;" Adobe Systems Incorporated, dated Sep. 2010.

Berners-Lee, T., et al.; "Uniform Resource Identifier (URI): Generic Syntax;" STD 66, RFC 3968, dated Jan. 2005; http://tools.ietf.org/html/rfc3986; date accessed Oct. 11, 2012.

Farber, N., et al.; "Adaptive progressive download based on the MPEG-4 file format;" Proceedings of International Packet Video Workshop 2006, Journal of Zhejiang University Science A, vol. 7, Suppl. 1; pp. 106-111; dated 2006.

Fielding, R., et al.; "HTTP/1.1, part 1: URLs, Connections, and Message Parsing;" draft-ietf-httpbis-p1-messaging-16(work in progress); dated Aug. 2001; http://tools.ietf.org/html/draft-ietf-httpbis-p1-messaging-16; date accessed Oct. 11, 2012.

Fielding, R., et al.; "HTTP/1.1, part 3: Message Payload and Content Negotiation;" draft-ietf-httpbis-p3-payload-16(work in progress); dated Aug. 2001; http://tools.ietf.org/html/draft-ietf-httpbis-p3-payload-16; date accessed Oct. 11, 2012.

Fielding, R., et al.; "HTTP/1.1, part 6: Caching;" draft-ietf-httpbis-p6-cache-16(work in progress); dated Aug. 2001; http://tools.ietf.org/html/draft-ietf-httpbis-p6-cache-16; date accessed Oct. 11, 2012.

Fielding, R., et al.; "Hypertext Transfer Protocol-HTTP/1.1;" RFC, dated Jun. 1999; http://www.w3.org/Protocols/rfc2616/rfc2616.html; date accessed Oct. 11, 2012.

ISO/IEC 23009-1; "Dynamic adaptive streaming over HTTP (DASH)—Part 1: Media presentation description and segment formats;" Draft Internaitonal Standard; dated Aug. 30, 2011.

Liu, C., et al.; "Rate adaptation for adaptive HTTP streaming;" Proceedings of ACM MMSys 2011, Speical Session: Modern Media Transport, Dynamic Adaptive Streaming over HTTP (DASH), dated Feb. 23-25, 2011.

Mutka A., et al.; "A system and a method for enhancing quality of experience of multimedia streaming for http adaptive streams based on network conditions;" IN02145CH2011, dated Apr. 13, 2011.

Rejaie, R., et al.; "Multimedia proxy caching mechanism for quality adaptive streaming applications in the Internet;" Proceedings of IEEE INFOCOM, dated Mar. 2000.

Zambelli, A.; "IIS smooth streaming techical overview;" Microsoft Corporation, dated 2009.

International Search Report and Written Opinion for Application No. PCT/FI2012/051189 dated May 13, 2013.

Office Action from U.S. Appl. No. 13/354,633, dated Jan. 7, 2015.

* cited by examiner

METHOD AND APPARATUS FOR FLEXIBLE CACHING OF DELIVERED MEDIA

TECHNICAL FIELD

Embodiments of the present invention relate generally to communication technology, and, more particularly, relate to a method and apparatus for accepting multiple representations via Dynamic Adaptive Streaming over Hypertext Transfer Protocol (HTTP) (DASH).

BACKGROUND

The modern communications era has brought about a tremendous expansion of wireline and wireless networks. Computer networks, television networks, and telephony networks are experiencing an unprecedented technological expansion, fueled by consumer demand. Wireless and mobile networking technologies have addressed related consumer demands, while providing more flexibility and immediacy of information transfer.

Current and future networking technologies continue to facilitate ease of information transfer and convenience to users. In order to provide easier or faster information transfer and convenience, telecommunication industry service providers are developing improvements to existing networks. In this regard, for example, improvements are being made to the universal mobile telecommunications system (UMTS) terrestrial radio access network (UTRAN). Further, for example, the evolved-UTRAN (E-UTRAN) is currently being developed. The E-UTRAN, which is also known as Long Term Evolution (LTE), is aimed at upgrading prior technologies by improving efficiency, lowering costs, improving services, making use of new spectrum opportunities, and providing better integration with other open standards.

As a result of improved networking technologies, the capacity for visual and audible media content distribution over the Internet has continued to increase. Users desire efficient and optimized access to this growing amount of media content through various access methods. An emerging standard for distributing media content to devices is known as DASH. The DASH standard provides media content for distribution based on a media presentation structure. The media presentation structure of DASH, however, focuses on the media content and not the method(s) a client can use for accessing the content.

SUMMARY

Methods, apparatuses, and computer program products are herein provided for appending the syntax of DASH segment requests to indicate that segments from other representations are allowed in responses. Further, and in some example embodiments, as described herein, a streaming client apparatus operation may be modified in such a way that the streaming client apparatus grants permission to have a respective segment from certain other representations as a response to a segment request. Further still, some example embodiments may modify a proxy operation such that a proxy cache apparatus may be configured to determine if alternative segments can be used in responses and, in an instance in which the request segment or any of the alternative segments are readily available in the proxy cache apparatus, selecting one of those segments to respond to the segment request.

In some example embodiments, a method is provided that comprises causing a request for at least one of a primary representation for a segment or an alternative representation for the segment to be transmitted to a caching proxy. The method of this embodiment may also include causing the caching proxy to respond with at least one of the primary representation or the alternative representation based on the caching status at a caching proxy. In some example embodiments, the caching proxy is configured to determine whether the request enables an alternative representation to be included in a response. The method of this embodiment may also include receiving at least one of the primary representation or the alternative representation for the segment from the caching proxy.

In another embodiment, an apparatus is provided that includes at least one processor and at least one memory including computer program code with the at least one memory and the computer program code being configured, with the at least one processor, to cause the apparatus to at least cause a request for at least one of a primary representation for a segment or an alternative representation for the segment to be transmitted to a caching proxy. The at least one memory and computer program code may also be configured to, with the at least one processor, cause the apparatus to cause the caching proxy to respond with at least one of the primary representation or the alternative representation based on the caching status at a caching proxy. In some example embodiments, the caching proxy is configured to determine whether the request enables an alternative representation to be included in a response. The at least one memory and computer program code may also be configured to, with the at least one processor, cause the apparatus to receive at least one of the primary representation or the alternative representation for the segment from the caching proxy.

In the further embodiment, a computer program product may be provided that includes at least one non-transitory computer-readable storage medium having computer-readable program instruction stored therein with the computer-readable program instructions including program instructions configured to cause a request for at least one of a primary representation for a segment or an alternative representation for the segment to be transmitted to a caching proxy. The computer-readable program instructions may also include program instructions configured to cause the caching proxy to respond with at least one of the primary representation or the alternative representation based on the caching status at a caching proxy. In some example embodiments, the caching proxy is configured to determine whether the request enables an alternative representation to be included in a response. The computer-readable program instructions may also include program instructions configured to receive at least one of the primary representation or the alternative representation for the segment from the caching proxy.

In yet another embodiment, an apparatus is provided that includes means for causing a request for at least one of a primary representation for a segment or an alternative representation for the segment to be transmitted to a caching proxy. The apparatus of this embodiment may also include means for causing the caching proxy to respond with at least one of the primary representation or the alternative representation based on the caching status at a caching proxy. In some example embodiments, the caching proxy is configured to determine whether the request enables an alternative representation to be included in a response. The apparatus of this embodiment may also include means for receiving at least one of the primary representation or the alternative representation for the segment from the caching proxy.

In some example embodiments, a method is provided that comprises causing a request for a caching proxy to provide a selectable cached alternative representation uniform resource indicator (URI) to be transmitted. The method of this embodiment may also include receiving a list and range of URI's for the selectable cached alternative representation for agent driven content negotiation. The method of this embodiment may also include causing a request for a resource of the selectable cached alternative representation for agent driven content negotiation to be transmitted. In some example embodiments, the resource is requested based on predetermined selection criteria.

In another embodiment, an apparatus is provided that includes at least one processor and at least one memory including computer program code with the at least one memory and the computer program code being configured, with the at least one processor, to cause the apparatus to at least cause a request for a caching proxy to provide a selectable cached alternative representation URI to be transmitted. The at least one memory and computer program code may also be configured to, with the at least one processor, cause the apparatus to receive a list and range of URI's for the selectable cached alternative representation for agent driven content negotiation. The at least one memory and computer program code may also be configured to, with the at least one processor, cause the apparatus to cause a request for a resource of the selectable cached alternative representation for agent driven content negotiation to be transmitted. In some example embodiments, the resource is requested based on predetermined selection criteria.

In the further embodiment, a computer program product may be provided that includes at least one non-transitory computer-readable storage medium having computer-readable program instruction stored therein with the computer-readable program instructions including program instructions configured to cause a request for a caching proxy to provide a selectable cached alternative representation URI to be transmitted. The computer-readable program instructions may also include program instructions configured to receive a list and range of URI's for the selectable cached alternative representation for agent driven content negotiation. The computer-readable program instructions may also include program instructions configured to cause a request for a resource of the selectable cached alternative representation for agent driven content negotiation to be transmitted. In some example embodiments, the resource is requested based on predetermined selection criteria.

In yet another embodiment, an apparatus is provided that includes means for causing a request for a caching proxy to provide a selectable cached alternative representation URI to be transmitted. The apparatus of this embodiment may also include means for receiving a list and range of URI's for the selectable cached alternative representation for agent driven content negotiation. The apparatus of this embodiment may also include means for causing a request for a resource of the selectable cached alternative representation for agent driven content negotiation to be transmitted. In some example embodiments, the resource is requested based on predetermined selection criteria.

In some example embodiments, a method is provided that comprises receiving a request for at least one of a primary representation or an alternative representation for a segment. The method of this embodiment may also include determining whether the request comprises an indication that a client will accept the alternative representation of the segment. The method of this embodiment may also include determining whether at least one of a primary URI associated with the primary representation is cached. The method of this embodiment may also include causing the primary representation of the segment to be transmitted in an instance in which the primary URI is cached. The method of this embodiment may also include determining whether at least one of the alternative URIs associated with the alternative representations is cached. The method of this embodiment may also include causing the alternative representation of the segment to be transmitted in an instance in which at least one of the alternative URIs is cached and the primary URI is not cached.

In another embodiment, an apparatus is provided that includes at least one processor and at least one memory including computer program code with the at least one memory and the computer program code being configured, with the at least one processor, to cause the apparatus to at least receive a request for at least one of a primary representation or an alternative representation for a segment. The at least one memory and computer program code may also be configured to, with the at least one processor, cause the apparatus to determine whether the request comprises an indication that a client will accept the alternative representation of the segment. The at least one memory and computer program code may also be configured to, with the at least one processor, cause the apparatus to determine whether at least one of a primary URI associated with the primary representation is cached. The at least one memory and computer program code may also be configured to, with the at least one processor, cause the apparatus to cause the primary representation of the segment to be transmitted in an instance in which the primary URI is cached. The at least one memory and computer program code may also be configured to, with the at least one processor, cause the apparatus to determine whether at least one of the alternative URIs associated with the alternative representations is cached. The at least one memory and computer program code may also be configured to, with the at least one processor, cause the apparatus to cause the alternative representation of the segment to be transmitted in an instance in which at least one of the alternative URIs is cached and the primary URI is not cached.

In the further embodiment, a computer program product may be provided that includes at least one non-transitory computer-readable storage medium having computer-readable program instruction stored therein with the computer-readable program instructions including program instructions configured to receive a request for at least one of a primary representation or an alternative representation for a segment. The computer-readable program instructions may also include program instructions configured to determine whether the request comprises an indication that a client will accept the alternative representation of the segment. The computer-readable program instructions may also include program instructions configured to determine whether at least one of a primary URI associated with the primary representation is cached. The computer-readable program instructions may also include program instructions configured to cause the primary representation of the segment to be transmitted in an instance in which the primary URI is cached. The computer-readable program instructions may also include program instructions configured to determine whether at least one of the alternative URIs associated with the alternative representations is cached. The computer-readable program instructions may also include program instructions configured to cause the alternative representation of the segment to be transmitted in an instance in which at least one of the alternative URIs is cached and the primary URI is not cached.

In yet another embodiment, an apparatus is provided that includes means for receiving a request for at least one of a primary representation or an alternative representation for a segment. The apparatus of this embodiment may also include means for determining whether the request comprises an indication that a client will accept the alternative representation of the segment. The apparatus of this embodiment may also include means for determining whether at least one of a primary URI associated with the primary representation is cached. The apparatus of this embodiment may also include means for causing the primary representation of the segment to be transmitted in an instance in which the primary URI is cached. The apparatus of this embodiment may also include means for determining whether at least one of the alternative URIs associated with the alternative representations is cached. The apparatus of this embodiment may also include means for causing the alternative representation of the segment to be transmitted in an instance in which at least one of the alternative URIs is cached and the primary URI is not cached.

In some example embodiments, a method is provided that comprises receiving a request for at least one of a primary representation or an alternative representation for a segment. The method of this embodiment may also include determining whether the request comprises an indication that a client will accept the alternative representation of the segment. The method of this embodiment may also include causing a list and range of URI's for a selectable cached alternative representation for agent driven content negotiation to be transmitted. The method of this embodiment may also include receiving a request for a resource of the selectable cached alternative representation for agent driven content negotiation.

In another embodiment, an apparatus is provided that includes at least one processor and at least one memory including computer program code with the at least one memory and the computer program code being configured, with the at least one processor, to cause the apparatus to at least receive a request for at least one of a primary representation or an alternative representation for a segment. The at least one memory and computer program code may also be configured to, with the at least one processor, cause the apparatus to determine whether the request comprises an indication that a client will accept the alternative representation of the segment. The at least one memory and computer program code may also be configured to, with the at least one processor, cause the apparatus to cause a list and range of URI's for a selectable cached alternative representation for agent driven content negotiation to be transmitted. The at least one memory and computer program code may also be configured to, with the at least one processor, cause the apparatus to receive a request for a resource of the selectable cached alternative representation for agent driven content negotiation.

In the further embodiment, a computer program product may be provided that includes at least one non-transitory computer-readable storage medium having computer-readable program instruction stored therein with the computer-readable program instructions including program instructions configured to receive a request for at least one of a primary representation or an alternative representation for a segment. The computer-readable program instructions may also include program instructions configured to determine whether the request comprises an indication that a client will accept the alternative representation of the segment. The computer-readable program instructions may also include program instructions configured to cause a list and range of URI's for a selectable cached alternative representation for agent driven content negotiation to be transmitted. The computer-readable program instructions may also include program instructions configured to receive a request for a resource of the selectable cached alternative representation for agent driven content negotiation.

In yet another embodiment, an apparatus is provided that includes means for receiving a request for at least one of a primary representation or an alternative representation for a segment. The apparatus of this embodiment may also include means for determining whether the request comprises an indication that a client will accept the alternative representation of the segment. The apparatus of this embodiment may also include means for causing a list and range of URI's for a selectable cached alternative representation for agent driven content negotiation to be transmitted. The apparatus of this embodiment may also include means for receiving a request for a resource of the selectable cached alternative representation for agent driven content negotiation.

The above summary is provided merely for purposes of summarizing some example embodiments of the invention so as to provide a basic understanding of some aspects of the invention. Accordingly, it will be appreciated that the above described example embodiments are merely examples and should not be construed to narrow the scope or spirit of the invention in any way. It will be appreciated that the scope of the invention encompasses many potential embodiments, some of which will be further described below, in addition to those here summarized.

BRIEF DESCRIPTION OF THE DRAWING(S)

Having thus described some example embodiments of the invention in general terms, reference will now be made to the accompanying drawings, which are not necessarily drawn to scale, and wherein:

Figure 4A:
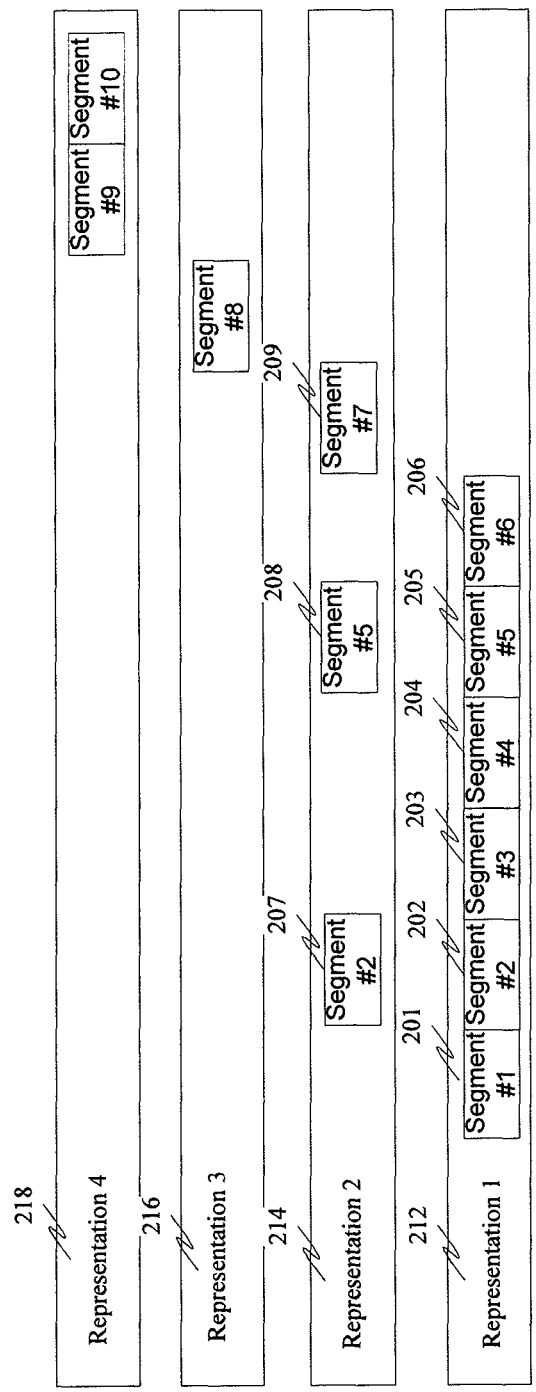
Figure 4B:
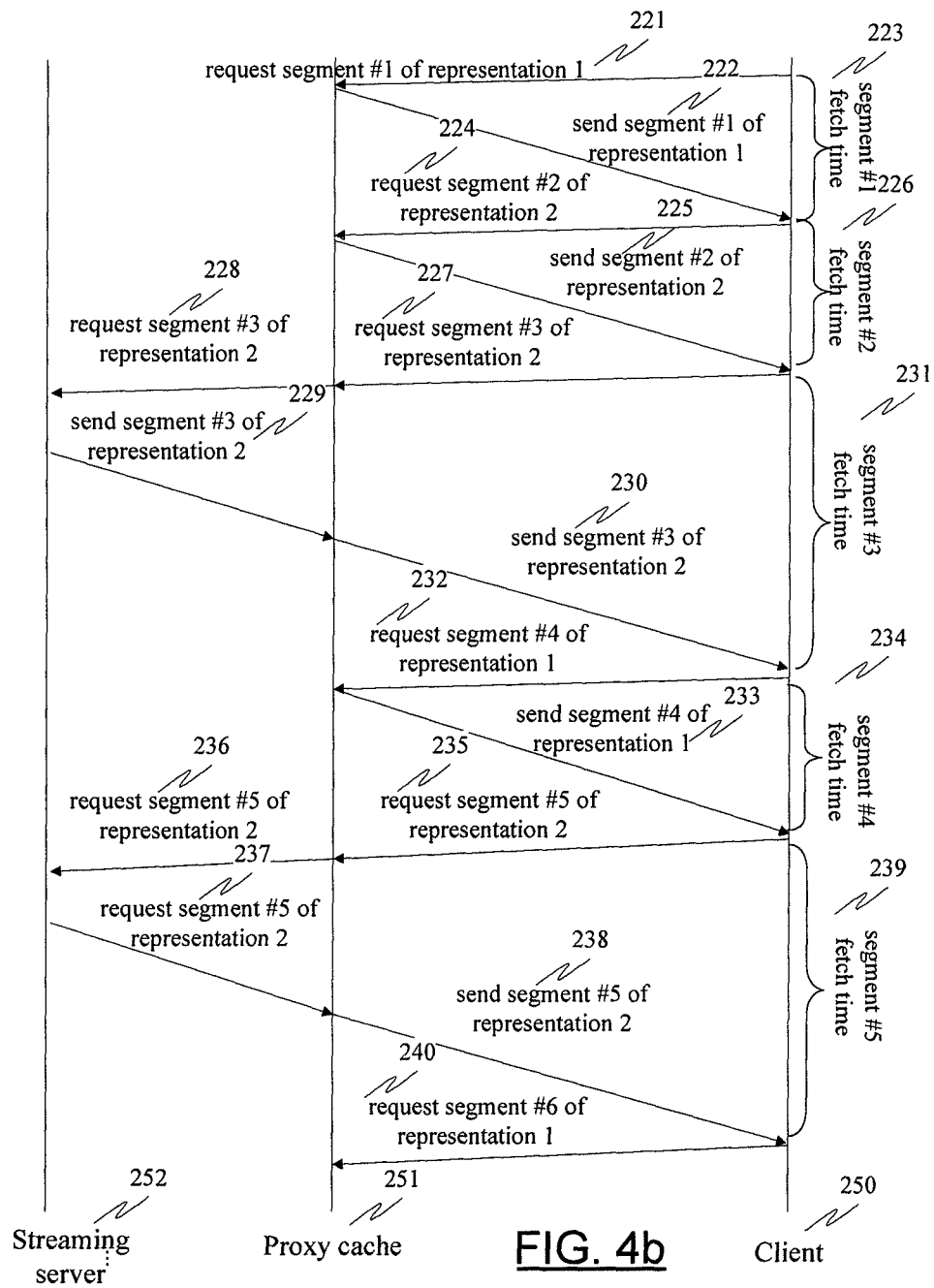
Figure 5:
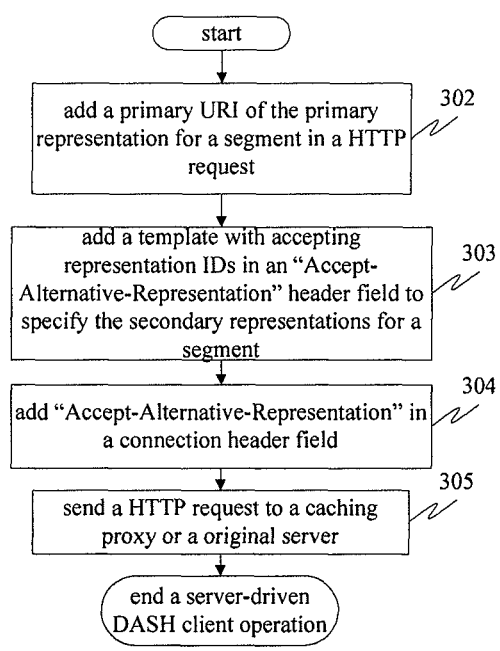
Figures 6A, 6B:
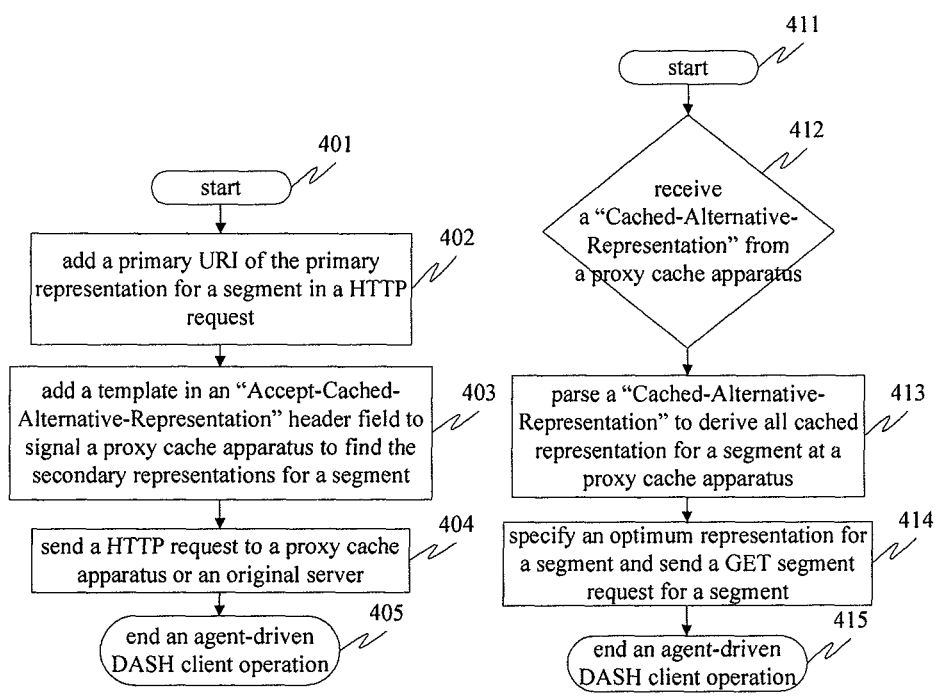
Figure 7:
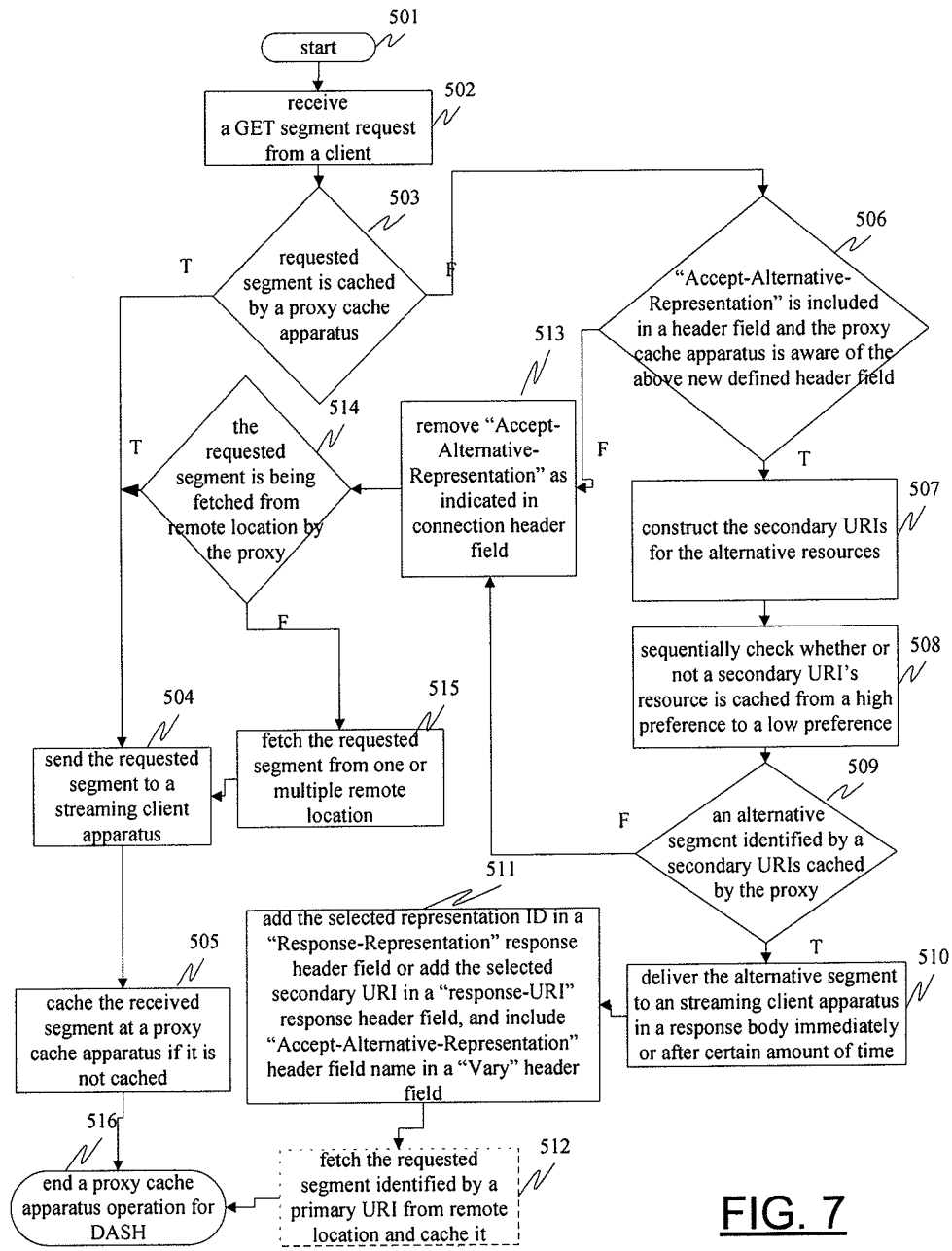
Figure 8:
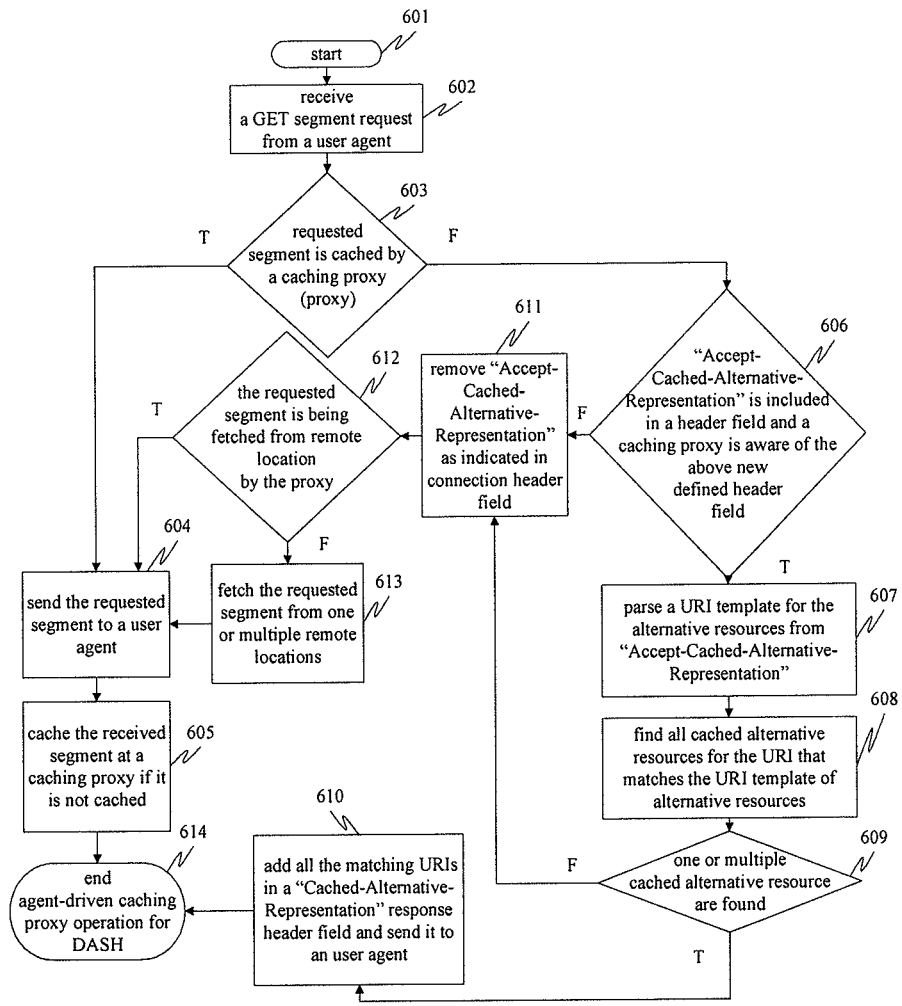
Figure 9:
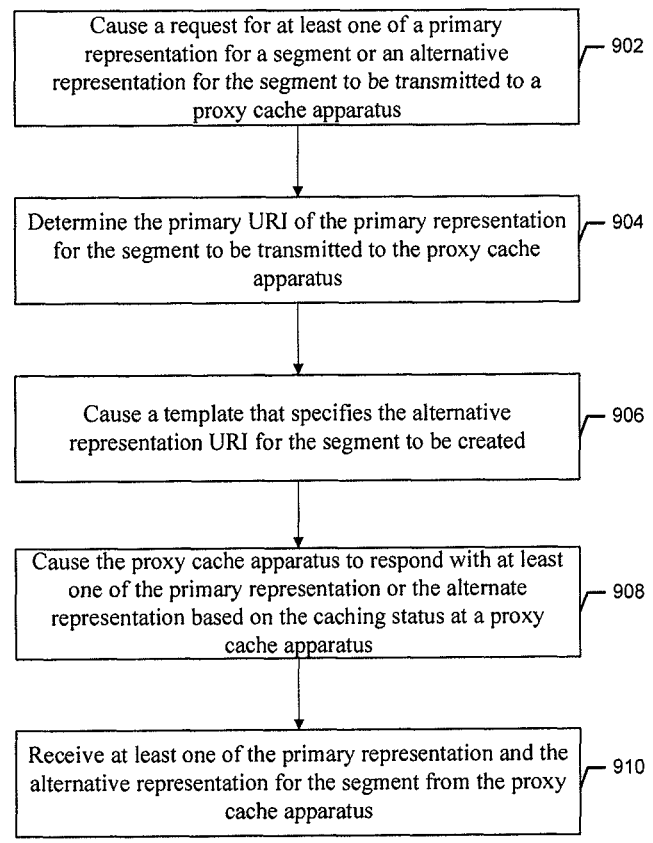
Figure 10:
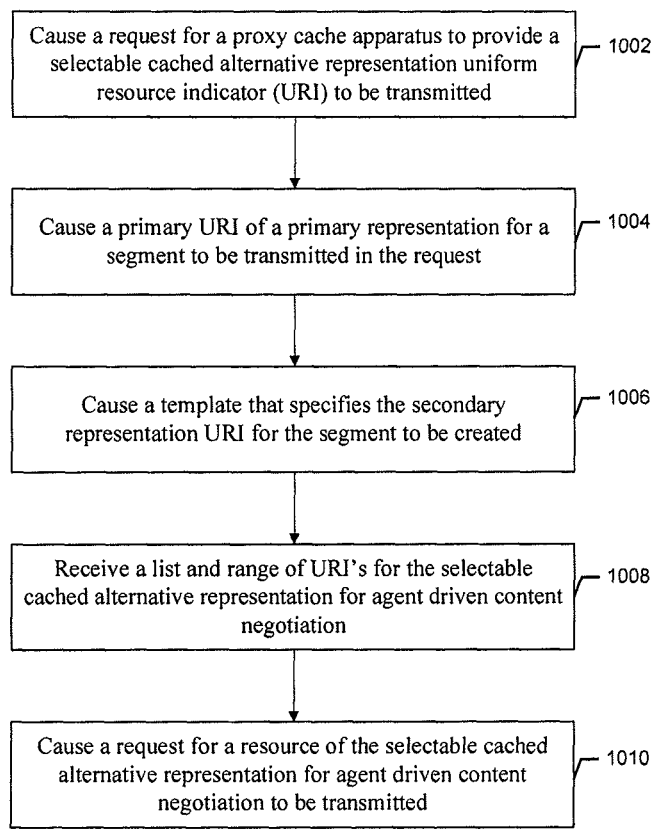
Figure 11:
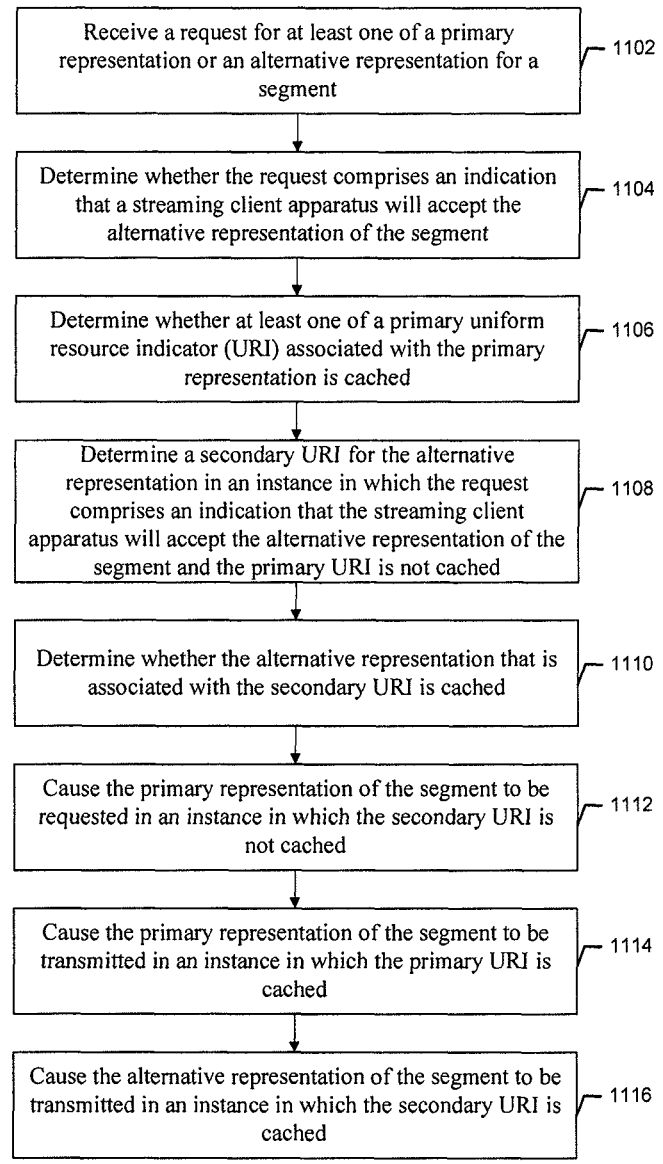
Figure 12:
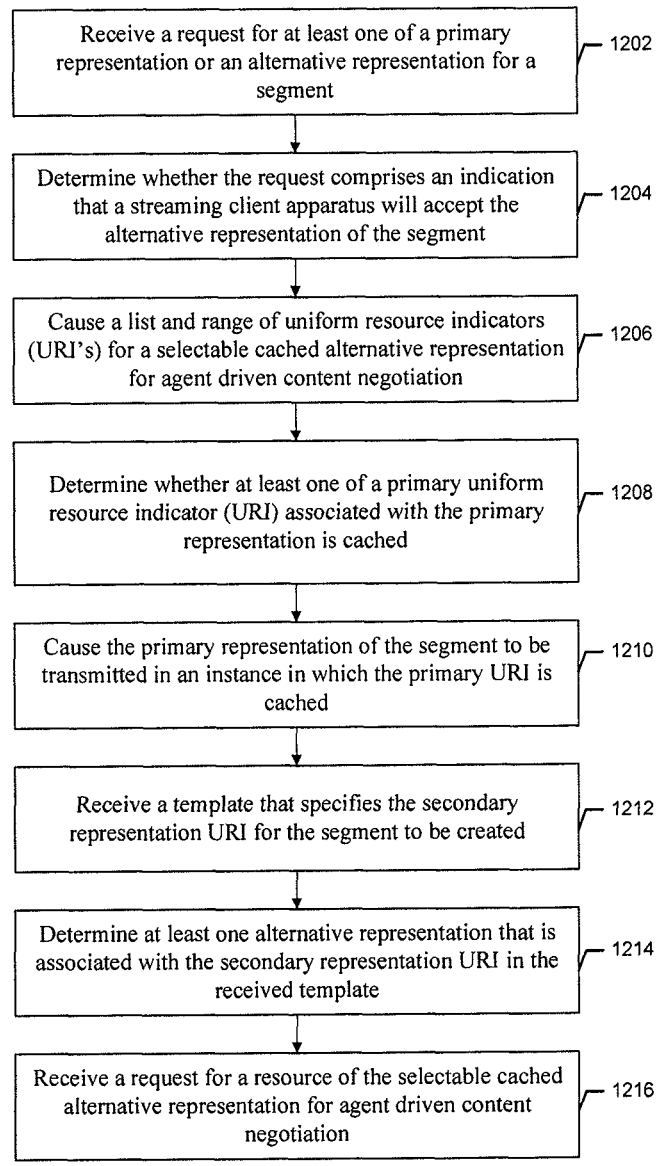

FIGS. 4*a* and 4*b* illustrate an example representation fluctuation at a client;

FIG. 5 illustrates a flowchart according to an example method for operation of a streaming client apparatus for server driven content negotiation according to some example embodiments of the current invention;

FIGS. 6*a* and 6*b* illustrate flowcharts according to an example method for operation of a streaming client apparatus for agent-driven content negotiation according to some example embodiments of the current invention;

FIG. 7 illustrates a flowchart according to an example method for operation of proxy cache apparatus for server-driven content negotiation according to some example embodiments of the current invention;

FIG. 8 illustrates a flowchart according to an example method for operation of proxy cache apparatus for agent-driven content negotiation according to some example embodiments of the current invention;

FIG. 9 illustrates a flowchart according to an example method for operation of a streaming client apparatus for server driven content negotiation according to some example embodiments of the current invention;

FIG. 10 illustrates a flowchart according to an example method for operation of a streaming client apparatus for agent-driven content negotiation according to some example embodiments of the current invention;

FIG. 11 illustrates a flowchart according to an example method for operation of a proxy cache apparatus for server-driven content negotiation according to some example embodiments of the current invention; and FIG. 12 illustrates a flowchart according to an example method for operation of a proxy cache apparatus for agent-driven content negotiation according to some example embodiments of the current invention.

DETAILED DESCRIPTION

Example embodiments of the present invention will now be described more fully hereinafter with reference to the accompanying drawings, in which some, but not all embodiments of the invention are shown. Indeed, the invention may be embodied in many different forms and should not be construed as limited to the embodiments set forth herein; rather, these embodiments are provided so that this disclosure will satisfy applicable legal requirements. Like reference numerals refer to like elements throughout.

The terms "data," "content," "information," and similar terms may be used interchangeably, according to some example embodiments of the present invention, to refer to data capable of being transmitted, received, operated on, displayed, and/or stored. Thus, use of any such terms should not be taken to limit the spirit and scope of the disclosure. Further, where a computing device is described herein to receive data from another computing device, it will be appreciated that the data may be received directly from the another computing device or may be received indirectly via one or more intermediary computing devices, such as, for example, one or more servers, relays, routers, network access points, base stations, and/or the like.

The term "computer-readable medium" as used herein refers to any medium configured to participate in providing information to a processor, including instructions for execution. Such a medium may take many forms, including, but not limited to a non-transitory computer-readable storage medium (for example, non-volatile media, volatile media), and transmission media. Transmission media include, for example, coaxial cables, copper wire, fiber optic cables, and carrier waves that travel through space without wires or cables, such as acoustic waves and electromagnetic waves, including radio, optical and infrared waves. Signals include man-made transient variations in amplitude, frequency, phase, polarization or other physical properties transmitted through the transmission media. Examples of non-transitory computer-readable media include a floppy disk, a flexible disk, hard disk, magnetic tape, any other non-transitory magnetic medium, a compact disc read only memory (CD-ROM), compact disc compact disc-rewritable (CD-RW), digital versatile disc (DVD), Blu-Ray, any other non-transitory optical medium, punch cards, paper tape, optical mark sheets, any other physical medium with patterns of holes or other optically recognizable indicia, a random access memory (RAM), a programmable read only memory (PROM), an erasable programmable read only memory (EPROM), a FLASH-EPROM, any other memory chip or cartridge, a carrier wave, or any other non-transitory medium from which a computer can read. The term computer-readable storage medium is used herein to refer to any computer-readable medium except transmission media. However, it will be appreciated that where embodiments are described to use a computer-readable storage medium, other types of computer-readable mediums may be substituted for or used in addition to the computer-readable storage medium in alternative embodiments.

As used herein, the term 'circuitry' refers to all of the following: (a) hardware-only circuit implementations (such as implementations in only analog and/or digital circuitry); (b) to combinations of circuits and computer program product(s) comprising software (and/or firmware instructions stored on one or more computer readable memories), such as (as applicable): (i) to a combination of processor(s) or (ii) to portions of processor(s)/software (including digital signal processor(s)), software, and memory(ies) that work together to cause an apparatus, such as a mobile phone or server, to perform various functions described herein); and (c) to circuits, such as, for example, a microprocessor(s) or a portion of a microprocessor(s), that require software or firmware for operation, even if the software or firmware is not physically present.

This definition of 'circuitry' applies to all uses of this term in this application, including in any claims. As a further example, as used in this application, the term "circuitry" would also cover an implementation of merely a processor (or multiple processors) or portion of a processor and its (or their) accompanying software and/or firmware. The term "circuitry" would also cover, for example and if applicable to the particular claim element, a baseband integrated circuit or applications processor integrated circuit for a mobile phone or a similar integrated circuit in a server, a cellular network device, other network device, and/or other computing device.

The various DASH standards (e.g., 3GPP DASH, MPEG DASH, etc.) define a format of a media presentation. A media presentation may comprise a sequence of one or more consecutive periods. Each period may comprise one or more representations of media content, which typically differ by encoding choice (e.g., bitrate, resolution, language, codec, etc.). A representation may comprise one or more media components, such that each media component defines an encoded version of a particular media type (e.g., audio, video, timed text, etc.). Each representation may comprise one or more media segments, each of which may contain media data and/or metadata related to the media content of the media presentation. Each media segment may be referenced by a unique HTTP Uniform Resource Locator (URL), which in some instances may be restricted by a byte range. The various representations of a media presentation may be assigned to one or more adaptation sets, such that representations in the same adaptation set are alternatives to each other and may be automatically switched during download and playback of the media presentation based on a number of factors associated with the download and playback (e.g., available bandwidth, time of access, etc.).

Typically, a media presentation is represented and described by a Media Presentation Description (MPD), which may also be referred to as a playlist file, manifest file, or streaming manifest file. For example, the media presentation may be represented by an MPD defined as a well-formatted Extensible Markup Language (XML) document according to a particular XML schema. According to DASH standards, an MPD, as well as the associated media presentation, may be accessible according to various types of delivery methods. For example, the media presentation defined by the MPD may be accessible via unicast (e.g., via Packet-Switched Streaming (PSS) service), multicast (e.g., Multimedia Broadcast Multicast Services (MBMS)), and broadcast (e.g., via Digital Video Broadcasting-Handheld (DVB-H), MBMS, etc.) connections.

In some example embodiments and in an instance in which only one representation is provided for a particular media clip that is delivered over DASH, then a caching proxy (that is a part of the delivery network) has typically cached all its segments after a client plays-out a whole video clip. A caching proxy server is a server that acts as an intermediary for requests from clients seeking resources and further accelerates service requests by retrieving content saved from a previous request made by the same client or even by other clients. However, the client may be configured to dynamically request different segments for different representations as DASH supports rate adaptation. Hence, segments from multiple representations may be cached by a caching proxy and the cached segments for each cached representation are not likely to form a complete representation.

The caching of multiple incomplete representations may cause a variation in a segment fetch time of different segments at the client. A segment fetch time denotes the time period from requesting a segment to receive the last byte of the segment by the client. For example, it may take much less time for a client to fetch a segment which is cached at the proxy compared to fetching a segment which is not cached at the proxy. The varying segment fetch time may further result into a variation in the buffered media time. A rate adaptation algorithm may use the segment fetch time or buffered media time or both to determine switch-up or switch-down representation level (where the representation level represents the level of media bitrates within an Adaptation Set, which may be controlled for example by quantization and/or spatial resolution and/or temporal resolution). Hence, clients may change the representation level due to the varying segment fetch time depending on which proxy server or originating server responds to the segment requests even if the throughput in the delivery network did not change and therefore there was no reason for changing representation levels.

The terms primary representation and the secondary representation(s) may be used herein to denote the highest preferred representation and the alternative representation(s), respectively, each of which may be associated with a preference. The primary representation, in some embodiments, may be considered to be equal to the representation used conventionally in DASH. As described herein, the secondary representation(s) and alternative representation(s) may be used interchangeably. Similarly to the terminology related to representations, the primary segment and the secondary segment are used to indicate the segments which belong to the primary representation and the secondary representation, respectively. In addition, the secondary segment may have the same start time and segment duration with the respective primary segment and the secondary segment and the respective primary segment should belong to different representations which are in the same Adaptation Set.

The term "user agent" is used to refer to the program that initiates a request, such as a WWW browser, editor, or spider (web-traversing robot) that are configured to operate on a streaming client apparatus, and the term "origin server" may be used to refer to the program that can originate authoritative responses to a request.

FIGS. 4a and 4b illustrate an example to demonstrate the problem of representation fluctuation at a client. In this example, it is assumed that the content provider provided four representations and each representation consists of ten segments with the same segment duration. As shown in the FIG. 4a, four representations are cached by a proxy and each representation is incompletely cached. For the representation 1 (212), the segments #1 (201), #2 (202), #3 (203), #4 (204), #5 (205) and #6 (206) are cached and the other segments of representation 1 not shown in 212 are not cached. Typically, a greater number of representations may be provided by the content provider to achieve fine-grained rate adaptation. As clients may adaptively switch between the provided representations, it may take time to cache a complete representation, to cache a complete Adaptation Set, to cache a complete Group, to cache a complete Period, and a complete media clip.

By way of example and shown with reference to FIGS. 4a and 4b, the proxy receives a GET segment #1 of representation 1 request from the client (221) and sends the cached segment #1 of representation 1 (201) to the client (222). The segment #1 fetch time is shown in 223. For the second segment, the proxy receive a GET segment #2 of representation 2 (224), the proxy sends the cached segment #2 of representation 2 (207) to the client (225). The segment fetching time #2 is shown in 226. The proxy receives a request for the GET segment #3 of representation 2 from the streaming client (227) and fetches the segment #3 of the representation 2 from remote location in 228 and 229, e.g. streaming server in this example. The proxy then sends the segment #3 of the representation 2 to the client (230). The segment #3 fetch time is shown in 231. The segment #3 fetch time (231) is much larger than the segment fetch time #2 (226), which may cause the client to switch-down representation level using the rate adaptation algorithm, such as using the rate adaptation method in Chenghao Liu, Imed Bouazizi and Moncef Gabbouj, "Rate adaptation for adaptive HTTP streaming," Proceedings of ACM MMSys 2011, which is incorporated by reference herein. The proxy receives a GET segment #4 of representation 1 from the client (232), the proxy sends the cached segment #4 of representation 1 (204) to the client (233). As the segment #4 is fetched using relatively shorter duration as shown in 234, the client may switch-up representation level again after receiving the segment #4. Hence a representation level may fluctuate between different representation levels instead of converging to a representation level, as shown in the FIG. 4b because the client fetches the segment from the proxy and remote streaming server in-turn. Furthermore, incorrect switching-up representation level may result in frequent playback interruption at DASH client since the limited bandwidth and relatively large Round Trip Time (RTT) between an origin server to proxy caches, especially when the origin server is located overseas relative to the DASH client. A buffered media time based rate adaptation method may be deployed to smooth the variation in the segment fetch time. However, missing several consecutive segments in the proxy and caching several consecutive segments may cause the high variation in the buffered media time and result in buffer draining-up. Furthermore, buffered media time based rate adaptation method may decline the rate adaptation speed, which may further cause buffer draining-up. For segment fetch time based and buffered media time based rate adaptation method for DASH over proxy cache, DASH client may frequently suffer from playback interruption due to the limited bandwidth and relatively large Round Trip Time (RTT) between an origin server to proxy caches, and incorrect rate adaptation.

Methods, apparatuses, and computer program products are herein provided for appending the syntax of DASH segment requests to indicate that segments from other representations are allowed in responses. Further some example embodiments, as described herein, may be configured to modify a streaming client apparatus operation in such a way that it grants the permission to have a respective segment from certain other representations as a response to a segment request. Further still, some example embodiments may modify a proxy operation such that a proxy cache apparatus may be configured to determine if alternative segments can be used in responses and, in an instance in which the request segment or any of the alternative segments are readily available in the proxy cache apparatus, selecting one of those segments to respond to the segment request.

Previously, a specific single segment (or more generically a single resource) identified by a specific URL could be requested with one HTTP GET request. That is there was no alternative or options for other segments (from other representations) to be indicated. Hence, proxies have not had means to respond to requests with alternative resources. Using the systems and methods as described herein, a proxy may be configured to respond to a request with a primary or alternative representation—hence, for example, the overall network traffic as well as the number of accesses to an origin server may be reduced. Moreover, for example, the average response time experienced by a client may decrease, as it is more likely that a proxy can respond to a request. Consequently, DASH clients (e.g. a streaming client apparatus) are likely to make fewer incorrect rate adaptation decisions due to late-arriving segments and are also likely to face fewer interruptions in playback due to the same reason.

Figure 1:
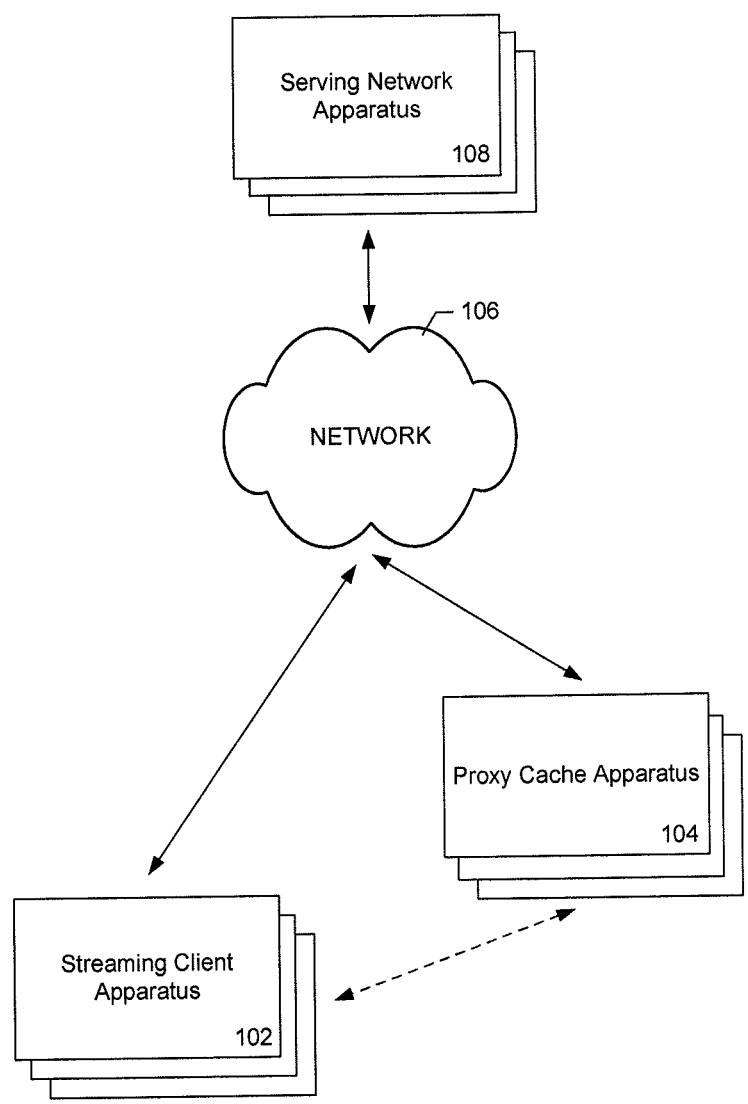
FIG. 1 illustrates a block diagram of a system for accepting multiple representations for DASH according to some example embodiments of the current invention.

Referring now to FIG. 1, FIG. 1 illustrates a block diagram of a system 100 for accepting multiple representations for DASH according to an example embodiment. It will be appreciated that the system 100 as well as the illustrations in other figures are each provided as an example of some embodiments and should not be construed to narrow the scope or spirit of the disclosure in any way. In this regard, the scope of the disclosure encompasses many potential embodiments in addition to those illustrated and described herein. As such, while FIG. 1 illustrates one example of a configuration of a system for accepting multiple representations for DASH, numerous other configurations may also be used to implement embodiments of the present invention.

The system 100 may include one or more streaming client apparatuses 102 (also known as a DASH client, user agent or the like), one or more proxy cache apparatuses 104 (also known as a proxy), and/or one or more serving network apparatuses 108. The system 100 may further comprise a network 106. The network 106 may comprise one or more wireline networks, one or more wireless networks, or some combination thereof. The network 106 may, for example, comprise a serving network (e.g., a serving cellular network) for one or more streaming client apparatuses 102 and/or more proxy cache apparatuses 104. The network 106 may comprise, in certain embodiments, one or more streaming client apparatuses 102, one or more proxy cache apparatuses 104, and/or one or more serving network apparatuses 108 themselves. According to example embodiments, the network 106 may comprise the Internet. The network 106 may comprise, in some embodiments, a Content Delivery Network (CDN), which may also be referred to as a Content Distribution Network. In various embodiments, the network 106 may comprise a wired access link connecting one or more streaming client apparatuses 102 or one or more proxy cache apparatuses 104 to the rest of the network 106 using, for example, Digital Subscriber Line (DSL) technology. In some embodiments, the network 106 may comprise a public land mobile network (for example, a cellular network), such as may be implemented by a network operator (for example, a cellular access provider). The network 106 may operate in accordance with universal terrestrial radio access network (UTRAN) standards, evolved UTRAN (E-UTRAN) standards, current and future implementations of Third Generation Partnership Project (3GPP) LTE (also referred to as LTE-A) standards, current and future implementations of International Telecommunications Union (ITU) International Mobile Telecommunications—Advanced (IMT-A) systems standards, and/or the like. It will be appreciated, however, that where references herein are made to a network standard and/or terminology particular to a network standard, the references are provided merely by way of example and not by way of limitation.

According to various embodiments, one or more streaming client apparatuses 102 may be configured to connect directly with one or more serving network apparatuses 108 via, for example, an air interface without routing communications via one or more elements of the network 106. Alternatively or additionally, one or more of the streaming client apparatuses 102 may be configured to communicate with one or more of the serving network apparatuses 108 over the network 106. In this regard, the serving network apparatuses 108 may comprise one or more nodes of the network 106. For example, in some example embodiments, the serving network apparatuses 108 may be at least partially embodied on one or more computing devices that comprise an element of a radio access network (RAN) portion of the network 106. In this regard, the serving network apparatuses 108 may, for example, be at least partially embodied on an access point of the network 106 (for example, a macrocell, microcell, picocell, femtocell, closed subscriber group (CSG) cell, base station, base transceiver station (BTS), node B, evolved node B, access point (AP), group owner, mesh station (STA), mesh point, and/or the like), which may, for example be configured to provide access to the network 106 (e.g., via a radio uplink) to one or more of the streaming client apparatuses 102. In some embodiments, the serving network apparatuses 108 may comprise an Access Network Discovery and Selection Function (ANDSF), and/or the like. Accordingly, each of the serving network apparatuses 108 may comprise a network node or a plurality of network nodes collectively configured to perform one or more operations attributed to the serving network apparatuses 108 as described with respect to various example embodiments disclosed herein.

Alternatively or additionally, according to some example embodiments, one or more streaming client apparatuses 102 may be configured to connect with the one or more proxy cache apparatuses 104. In such embodiments, the one or more proxy cache apparatuses 104 may be in communication with the one or more serving network apparatuses 108 in the same or similar fashions as described with respect to the one or more of the streaming client apparatuses 102 described above.

According to various embodiments, the system 100 may be configured according to an architecture for providing for distribution of media content. In this regard, the system 100 may be configured as an HTTP streaming system. For example, the system 100 may be configured to distribute one or more media presentations, as defined by a DASH standard such as 3GPP DASH (3GPP Technical Specification 26.246) or Moving Picture Experts Group (MPEG) DASH (ISO/IEC International Standard 23009-1) both of which are incorporated by reference herein.

According to various embodiments, the system 100 may be configured to implement a server-driven alternative representation method, for example a streaming client apparatus 102 may cause a proxy cache apparatus 104 to respond to an HTTP request with a primary representation or an alternative representation depending on the caching status at a proxy cache apparatus 104. According to various embodiments, the system 100 may also be configured to implement an agent-driven alternative representation method, for example a streaming client apparatus 102 may cause a proxy cache apparatus 104 to provide the cached alternative resources' uniform resource indicator (URI) for selection. Upon receiving a signaling from a proxy cache apparatus 104, a streaming client apparatus 102 may request optimum resource for agent-driven content negotiation.

In some example embodiments, an alternative representation as described herein may represent a representation cached by a proxy cache apparatus 104 that is accepted by a streaming client apparatus 102 as an alternative to the requested primary representation. Moreover, the signaling for the alternative representations occurs between a streaming client apparatus 102 and a proxy cache apparatus 104.

In various embodiments below, a list of alternative URLs, representations, resources, or alike is provided in the segment request syntax. The list can be unordered, i.e. a streaming client apparatus 102 may not have an indicated preference which one(s) of the members of the list it would like to receive in the response. Alternatively, the list can be ordered, i.e. a certain item in the list may be preferred to be received instead of any items following that certain item in the list. Alternatively, the list may be a combination of ordered and unordered items, where it is indicated whether a particular list item is listed in priority order relative to other ordered items or whether the placement of a particular list item in the list indicates no preference relative to other list items. Alternatively, the preferences between the list items may be explicitly indicated for example by giving or deriving a priority value for each list item. The same priority value may be used if the client has no preference between the respective list items.

Alternatively or additionally, some embodiments of the system 100 may comprise server-driven content negotiation, where the streaming client apparatus 102 indicates its preferences in the HTTP GET request and the proxy cache apparatus 104 selects the resource that suits streaming client's needs and preferences. In agent-driven content negotiation, where the proxy cache apparatus 104 may respond with a number of alternative URIs from which the client can choose the best URI suited for its needs.

A streaming client apparatus 102 may be embodied as any computing device, such as, for example, a desktop computer, laptop computer, mobile terminal, mobile computer, mobile phone, mobile communication device, tablet computing device, game device, digital camera/camcorder, audio/video player, television device, radio receiver, digital video recorder, positioning device, wrist watch, portable digital assistant (PDA), fixed transceiver device (e.g., attached to traffic lights, energy meters, light bulbs, and/or the like), a chipset, an apparatus comprising a chipset, any combination thereof, and/or the like.

Figure 2:
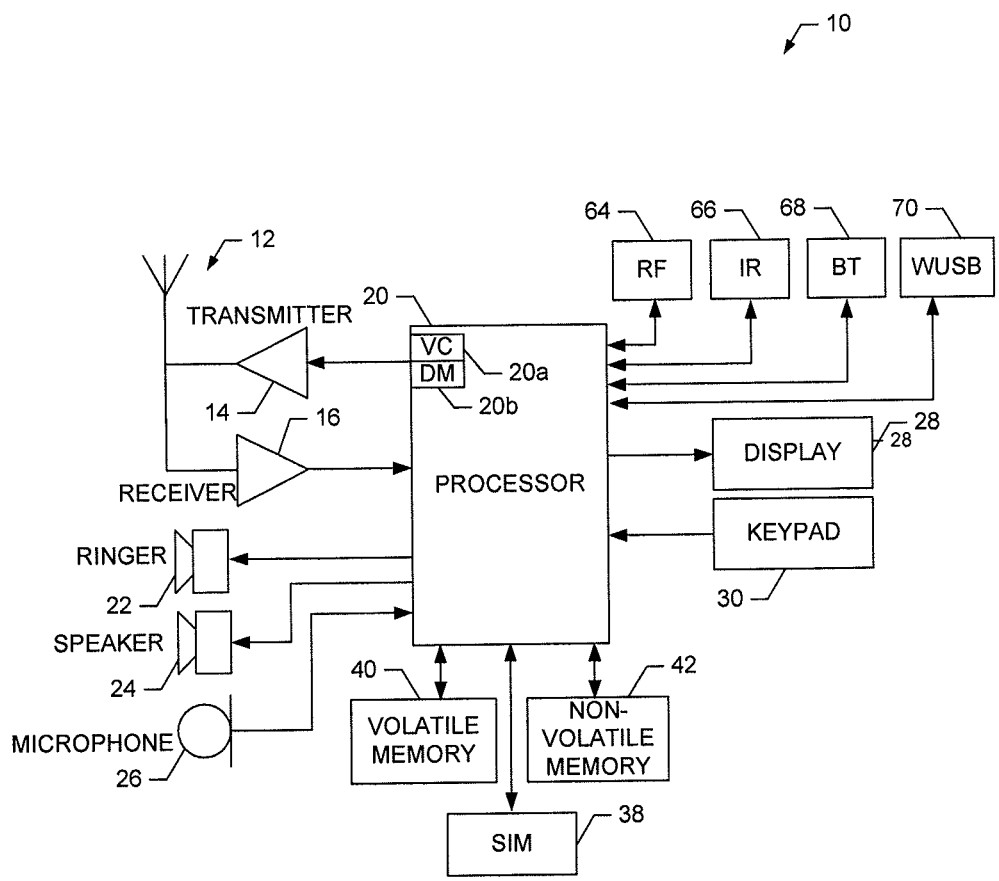
FIG. 2 illustrates a block diagram of a mobile terminal representative of one embodiment of a streaming client apparatus according to some example embodiments of the current invention.

In some example embodiments, a streaming client apparatus 102 may be embodied as a mobile terminal, such as that illustrated in FIG. 2. In this regard, FIG. 2 illustrates a block diagram of a mobile terminal 10 representative of one embodiment of a streaming client apparatus 102. It should be understood, however, that the mobile terminal 10 illustrated and hereinafter described is merely illustrative of one type of computing device (i.e., streaming client apparatus 102) that may implement and/or benefit from various embodiments and, therefore, should not be taken to limit the scope of the disclosure. While several embodiments of the electronic device are illustrated and will be hereinafter described for purposes of example, other types of electronic devices, such as mobile telephones, mobile computers, portable digital assistants (PDAs), pagers, laptop computers, desktop computers, gaming devices, televisions, and other types of electronic systems, may employ various embodiments of the invention.

As shown, the mobile terminal 10 may include an antenna 12 (or multiple antennas 12) in communication with a transmitter 14 and a receiver 16. The mobile terminal 10 may also include a processor 20 configured to provide signals to and receive signals from the transmitter and receiver, respectively. The processor 20 may, for example, be embodied as various means including circuitry, one or more microprocessors with accompanying digital signal processor(s), one or more processor(s) without an accompanying digital signal processor, one or more coprocessors, one or more multi-core processors, one or more controllers, processing circuitry, one or more computers, various other processing elements including integrated circuits such as, for example, an ASIC (application specific integrated circuit) or FPGA (field programmable gate array), or some combination thereof. Accordingly, although illustrated in FIG. 2 as a single processor, in some example embodiments the processor 20 may comprise a plurality of processors. These signals sent and received by the processor 20 may include signaling information in accordance with an air interface standard of an applicable cellular system, and/or any number of different wireline or wireless networking techniques, comprising but not limited to Wi-Fi, wireless local access network (WLAN) techniques such as Bluetooth™ (BT), Ultra-wideband (UWB), Institute of Electrical and Electronics Engineers (IEEE) 802.11, 802.16, and/or the like. In addition, these signals may include speech data, user generated data, user requested data, and/or the like. In this regard, the mobile terminal may be capable of operating with one or more air interface standards, communication protocols, modulation types, access types, and/or the like. More particularly, the mobile terminal may be capable of operating in accordance with various first generation (1G), second generation (2G), 2.5G, third-generation (3G) communication protocols, fourth-generation (4G) communication protocols, Internet Protocol Multimedia Subsystem (IMS) communication protocols (for example, session initiation protocol (SIP)), and/or the like. For example, the mobile terminal may be capable of operating in accordance with 2G wireless communication protocols IS-136 (Time Division Multiple Access (TDMA)), Global System for Mobile communications (GSM), IS-95 (Code Division Multiple Access (CDMA)), and/or the like. Also, for example, the mobile terminal may be capable of operating in accordance with 2.5G wireless communication protocols General Packet Radio Service (GPRS), Enhanced Data GSM Environment (EDGE), and/or the like. Further, for example, the mobile terminal may be capable of operating in accordance with 3G wireless communication protocols such as Universal Mobile Telecommunications System (UMTS), Code Division Multiple Access 2000 (CDMA2000), Wideband Code Division Multiple Access (WCDMA), Time Division-Synchronous Code Division Multiple Access (TD-SCDMA), and/or the like. The mobile terminal may be additionally capable of operating in accordance with 3.9G wireless communication protocols such as Long Term Evolution (LTE) or Evolved Universal Terrestrial Radio Access Network (E-UTRAN) and/or the like. Additionally, for example, the mobile terminal may be capable of operating in accordance with fourth-generation (4G) wireless communication protocols such as LTE Advanced and/or the like as well as similar wireless communication protocols that may be developed in the future.

Some Narrow-band Advanced Mobile Phone System (NAMPS), as well as Total Access Communication System (TACS), mobile terminals may also benefit from embodiments of this invention, as should dual or higher mode phones (for example, digital/analog or TDMA/CDMA/analog phones). Additionally, the mobile terminal 10 may be capable of operating according to Wi-Fi or Worldwide Interoperability for Microwave Access (WiMAX) protocols.

It is understood that the processor 20 may comprise circuitry for implementing audio/video and logic functions of the mobile terminal 10. For example, the processor 20 may comprise a digital signal processor device, a microprocessor device, an analog-to-digital converter, a digital-to-analog converter, and/or the like. Control and signal processing functions of the mobile terminal may be allocated between these devices according to their respective capabilities. The processor may additionally comprise an internal voice coder (VC) 20a, an internal data modem (DM) 20b, and/or the like. Further, the processor may comprise functionality to operate one or more software programs, which may be stored in memory. For example, the processor 20 may be capable of operating a connectivity program, such as a web browser. The connectivity program may allow the mobile terminal 10 to transmit and receive web content, such as location-based content, according to a protocol, such as Wireless Application Protocol (WAP), hypertext transfer protocol (HTTP), and/or the like. The mobile terminal 10 may be capable of using Transmission Control Protocol/Internet Protocol (TCP/IP) to transmit and receive web content across the internet or other networks.

The mobile terminal 10 may also comprise a user interface including, for example, an earphone or speaker 24, a ringer 22, a microphone 26, a display 28, a user input interface, and/or the like, which may be operationally coupled to the processor 20. In this regard, the processor 20 may comprise user interface circuitry configured to control at least some functions of one or more elements of the user interface, such as, for example, the speaker 24, the ringer 22, the microphone 26, the display 28, and/or the like. The processor 20 and/or user interface circuitry comprising the processor 20 may be configured to control one or more functions of one or more elements of the user interface through computer program instructions (for example, software and/or firmware) stored on a memory accessible to the processor 20 (for example, volatile memory 40, non-volatile memory 42, and/or the like). Although not shown, the mobile terminal may comprise a battery for powering various circuits related to the mobile terminal, for example, a circuit to provide mechanical vibration as a detectable output. The user input interface may comprise devices allowing the mobile terminal to receive data, such as a keypad 30, a touch display (not shown), a joystick (not shown), and/or other input device. In embodiments including a keypad, the keypad may comprise numeric (0-9) and related keys (#, *), and/or other keys for operating the mobile terminal.

As shown in FIG. 2, the mobile terminal 10 may also include one or more means for sharing and/or obtaining data. For example, the mobile terminal may comprise a short-range radio frequency (RF) transceiver and/or interrogator 64 so data may be shared with and/or obtained from electronic devices in accordance with RF techniques. The mobile terminal may comprise other short-range transceivers, such as, for example, an infrared (IR) transceiver 66, a Bluetooth™ (BT) transceiver 68 operating using Bluetooth™ brand wireless technology developed by the Bluetooth™ Special Interest Group, a wireless universal serial bus (USB) transceiver 70 and/or the like. The Bluetooth™ transceiver 68 may be capable of operating according to low power/energy or ultra-low power/energy Bluetooth™ technology (for example, Wibree™) radio standards. In this regard, the mobile terminal 10 and, in particular, the short-range transceiver may be capable of transmitting data to and/or receiving data from electronic devices within a proximity of the mobile terminal, such as within 10 meters, for example. Although not shown, the mobile terminal may be capable of transmitting and/or receiving data from electronic devices according to various wireless networking techniques, including 6LoWpan, Wi-Fi, Wi-Fi low power, WLAN techniques such as IEEE 802.11 techniques, IEEE 802.15 techniques, IEEE 802.16 techniques, and/or the like.

The mobile terminal 10 may comprise memory, such as a removable or non-removable subscriber identity module (SIM) 38, a soft SIM 38, a fixed SIM 38, a removable or non-removable universal subscriber identity module (USIM) 38, a soft USIM 38, a fixed USIM 38, a removable user identity module (R-UIM), and/or the like, which may store information elements related to a mobile subscriber. In addition to the SIM, the mobile terminal may comprise other removable and/or fixed memory. The mobile terminal 10 may include volatile memory 40 and/or non-volatile memory 42. For example, volatile memory 40 may include Random Access Memory (RAM) including dynamic and/or static RAM, on-chip or off-chip cache memory, and/or the like. Non-volatile memory 42, which may be embedded and/or removable, may include, for example, read-only memory, flash memory, magnetic storage devices (for example, hard disks, floppy disk drives, magnetic tape, etc.), optical disc drives and/or media, non-volatile random access memory (NVRAM), and/or the like. Like volatile memory 40 non-volatile memory 42 may comprise a cache area for temporary storage of data. The memories may store one or more software programs, instructions, pieces of information, data, and/or the like which may be used by the mobile terminal for performing functions of the mobile terminal. For example, the memories may comprise an identifier, such as an international mobile equipment identification (IMEI) code, capable of uniquely identifying the mobile terminal 10.

Figure 3:
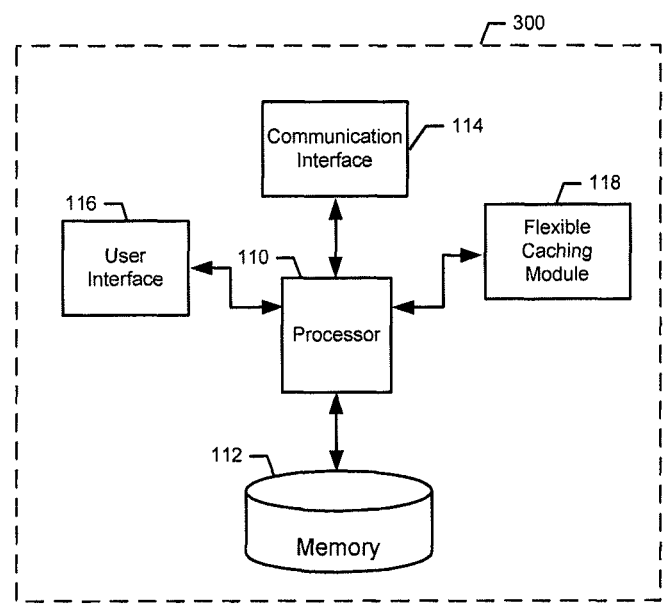
FIG. 3 illustrates a block diagram of an apparatus according to some example embodiments of the current invention.

Referring now to FIG. 3, FIG. 3 illustrates a block diagram of an apparatus 300 according to an example embodiment. In the example embodiment, the streaming client apparatus 102, the proxy cache apparatus 104, and/or the serving network apparatus 108 may be implemented in or otherwise embodied by the apparatus 300. These means may comprise one or more of a processor 110, memory 112, communication interface 114, user interface 116, or flexible caching module 118. The means of the apparatus 300 as described herein may be embodied as, for example, circuitry, hardware elements (e.g., a suitably programmed processor, combinational logic circuit, and/or the like), a computer program product comprising computer-readable program instructions (e.g., software or firmware) stored on a computer-readable medium (for example memory 112) that is executable by a suitably configured processing device (e.g., the processor 110), or some combination thereof.

In some example embodiments, one or more of the means illustrated in FIG. 3 may be embodied as a chip or chip set. In other words, the apparatus 300 may comprise one or more physical packages (for example, chips) including materials, components and/or wires on a structural assembly (for example, a baseboard). The structural assembly may provide physical strength, conservation of size, and/or limitation of electrical interaction for component circuitry included thereon. In this regard, the processor 110, memory 112, communication interface 114, user interface 116, and/or flexible caching module 118 may be embodied as a chip or chip set. The apparatus 300 may therefore, in some example embodiments, be configured to implement embodiments of the present invention on a single chip or as a single "system on a chip." As another example, in some example embodiments, the apparatus 300 may comprise component(s) configured to implement embodiments of the present invention on a single chip or as a single "system on a chip." As such, in some cases, a chip or chipset may constitute means for performing one or more operations for providing the functionalities described herein and/or for enabling user interface navigation with respect to the functionalities and/or services described herein.

The processor 110 may, for example, be embodied as various means including one or more microprocessors with accompanying digital signal processor(s), one or more processor(s) without an accompanying digital signal processor, one or more coprocessors, one or more multi-core processors, one or more controllers, processing circuitry, one or more computers, various other processing elements including integrated circuits such as, for example, an ASIC (application specific integrated circuit) or FPGA (field programmable gate array), one or more other hardware processors, or some combination thereof. Accordingly, although illustrated in FIG. 3 as a single processor, in some embodiments the processor 110 may comprise a plurality of processors. The plurality of processors may be in operative communication with each other and may be collectively configured to perform one or more functionalities of the apparatus 300 as described herein. The plurality of processors may be embodied on a single computing device or distributed across a plurality of computing devices collectively configured to function as the apparatus 300. In embodiments wherein the apparatus 300 is embodied as a mobile terminal 10, the processor 110 may be embodied as or comprise the processor 20. In some example embodiments, the processor 110 is configured to execute instructions stored in the memory 112 or otherwise accessible to the processor 110. These instructions, when executed by the processor 110, may cause the apparatus 300 to perform one or more of the functionalities of the apparatus 300 as described herein. As such, whether configured by hardware or software methods, or by a combination thereof, the processor 110 may comprise an entity capable of performing operations according to embodiments of the present invention while configured accordingly. Thus, for example, when the processor 110 is embodied as an ASIC, FPGA or the like, the processor 110 may comprise specifically configured hardware for conducting one or more operations described herein. Alternatively, as another example, when the processor 110 is embodied as an executor of instructions, such as may be stored in the memory 112, the instructions may specifically configure the processor 110 to perform one or more algorithms and operations described herein.

The memory 112 may comprise, for example, volatile memory, non-volatile memory, or some combination thereof. In this regard, the memory 112 may comprise one or more tangible and/or non-transitory computer-readable storage media that may include volatile and/or non-volatile memory. Although illustrated in FIG. 3 as a single memory, the memory 112 may comprise a plurality of memories. The plurality of memories may be embodied on a single computing device or may be distributed across a plurality of computing devices collectively configured to function as the apparatus 300. In various example embodiments, the memory 112 may comprise a hard disk, random access memory, cache memory, flash memory, a compact disc read only memory (CD-ROM), digital versatile disc read only memory (DVD-ROM), an optical disc, circuitry configured to store information, or some combination thereof. In embodiments wherein the apparatus 300 is embodied as a mobile terminal 10, the memory 112 may comprise the volatile memory 40 and/or the non-volatile memory 42. The memory 112 may be configured to store information, data, applications, instructions, or the like for enabling the apparatus 300 to carry out various functions in accordance with various example embodiments. For example, in some example embodiments, the memory 112 is configured to buffer input data for processing by the processor 110. Additionally or alternatively, the memory 112 may be configured to store program instructions for execution by the processor 110. The memory 112 may store information in the form of static and/or dynamic information. This stored information may be stored and/or used by the flexible caching module 118 during the course of performing its functionalities.

The communication interface 114 may be embodied as any device or means embodied in circuitry, hardware, a computer program product comprising computer readable program instructions stored on a computer readable medium (for example, the memory 112) and executed by a processing device (for example, the processor 110), or a combination thereof that is configured to receive and/or transmit data from/to another computing device. In an example embodiment, the communication interface 114 may be at least partially embodied as or otherwise controlled by the processor 110. In this regard, the communication interface 114 may be in communication with the processor 110, such as via a bus. The communication interface 114 may include, for example, an antenna, a transmitter, a receiver, a transceiver and/or supporting hardware or software for enabling communications with one or more remote computing devices. The communication interface 114 may be configured to receive and/or transmit data using any protocol that may be used for communications between computing devices. In this regard, the communication interface 114 may be configured to receive and/or transmit data using any protocol that may be used for transmission of data over a wireless network, wireline network, some combination thereof, or the like by which the streaming client apparatus 102 and one or more computing devices or computing resources may be in communication. As an example, the communication interface 114 may be configured to enable communication between the apparatus 300 and another device, such as another apparatus 300. As a further example, the communication interface 114 may be configured to enable communication via the network 106. The communication interface 114 may additionally be in communication with the memory 112, user interface 116, and/or flexible caching module 118, such as via a bus.

The user interface 116 may be in communication with the processor 110 to receive an indication of a user input and/or to provide an audible, visual, mechanical, or other output to a user. As such, the user interface 116 may include, for example, a keyboard, a mouse, a joystick, a display, a touch screen display, a microphone, a speaker, and/or other input/output mechanisms. In embodiments wherein the user interface 116 comprises a touch screen display, the user interface 116 may additionally be configured to detect and/or receive indication of a touch gesture or other input to the touch screen display. The user interface 116 may be in communication with the memory 112, communication interface 114, and/or flexible caching module 118, such as via a bus.

The flexible caching module 118 may be embodied as various means, such as circuitry, hardware, a computer program product comprising computer readable program instructions stored on a computer readable medium (for example, the memory 112) and executed by a processing device (for example, the processor 110), or some combination thereof and, in some embodiments, is embodied as or otherwise controlled by the processor 110. In embodiments wherein the flexible caching module 118 is embodied separately from the processor 110, the flexible caching module 118 may be in communication with the processor 110. The flexible caching module 118 may further be in communication with one or more of the memory 112, communication interface 114, or user interface 116, such as via a bus.

In some example embodiments, the flexible caching module 118 is configured to set an @segmentAlignment in an MPD to a non-false value. Such a setting may indicate that presentation start and end times of media components of any particular media type are temporally aligned in all Segments across all Representations in the Adaptation Set (in which the @segmentAlignment is included).

In some example embodiments, the streaming client apparatus 102, such as by using the processor 110, the flexible caching module 118 or the like, may be configured to use an "Accept-Alternative-URI" header field to specify URIs that are acceptable as responses to a GET request in which the "Accept-Alternative-URI" header field is included. In some example embodiments the "Accept-Alternative-URI" header field may be used in server-driven content negotiation. A syntax of an "Accept-Alternative-URI" header field may be specified as follows using a form of the Augmented Backus-Naur Form (ABNF):

```
Accept-Alternative-URI = #(Alternative-URI [OWS ";" OWS
"q=" qvalue])
Alternative-URI="http:" "//" alternative authority path-
abempty [ "?" query]
```

In some example embodiments, the proxy cache apparatus 104 of FIG. 1 may be configured to respond to a GET request, such as by using the processor 110, the communications interface 114, the flexible caching module 118 or the like in an instance in which the requested resource or any of the resources listed in the "Accept-Alternative-URI" header and any of those resources fulfills the other requirements of the request, indicated for example by one of more of the header fields for enabling server-driven content negotiation or cache control directives of the request.

In some example embodiments, "Accept-Alternative-URI" may be used with a "Connection" header field and may specify the "Accept-Alternative-URI." A "Connection" header field may enable a streaming client apparatus 102 to specify that the "Accept-Alternative-URI" option is desired for the connection between the streaming client apparatus 102 and the proxy cache apparatus 104. A "Connection" ABNF syntax for "Accept-Alternative-URI" is defined as follows

```
Connection = 1#connectin-token
Connection-token = Accept-Alternative-URI
```

In some embodiments, the proxy cache apparatus 104, such as the by the processor 110, the flexible caching module 118 or the like, may parse a received Connection header field before a message is forwarded and, for each connection-token in this field, remove any header field(s) from the message with the same name as the connection-token, specifically Accept-Alternative-URI, and then remove the Connection header field itself or replace it with the sender's own connection options for the forwarded message. In some cases, a HTTP GET request may be forwarded in an instance in which a proxy has no requested resource or any of the resources listed in the "Accept-Alternative-URI" available.

In some example embodiments, an example HTTP GET request may include a first URI (for a particular segment of a first representation) including a number of accepted q values and an indication of a segment from another representation that may be a proper response. The segment from the other representation may originally have had a different URI than the requested URI. Hence, the same resource may appear in subsequent proxies or caches under different URIs. Cache directives may therefore be used to prevent caching of the response in any subsequent proxies/caches.

A HTTP GET segment #1 may include an example of "Accept-Alternative-URI" usage:

```
GET http://example.com/contents/rep-5/seg-1.3gp
Connection: Accept-Alternative-URI
Accept-Alternative-URI: http://example.com/contents/rep-
4/seg-1.3gp; q=0.8,
    http://example.com/contents/rep-3/seg-1.3gp;
q=0.6
```

An example HTTP GET segment #2 request:

```
GET http://example.com/contents/rep-6/seg-2.3gp
Connection: Accept-Alternative-URI
Accept-Alternative-URI: http://example.com/contents/rep-
5/seg-1.3gp; q=0.8,
    http://example.com/contents/rep-4/seg-1.3gp;
q=0.5
```

With reference to the example of an HTTP GET request for segment #1 above, example.com/contents/rep-5/seg-1.3gp may be identified as the primary URI, and http://example.com/contents/rep-4/seg-1.3gp and example.com/contents/rep-3/seg-1.3gp may be identifies as alternative URIs.

In an instance in which a proxy cache apparatus 104 determines a resource for the primary URI, it may be configured to respond to a streaming client apparatus 102 with the primary URI.

In an instance in which the primary resource is not cached at a proxy cache apparatus 104, then the proxy cache apparatus 104 may respond, such as by the processor 110, the communications interface 114, the flexible caching module 118 or the like, with a resource, such as a secondary resource. With reference to the example of an HTTP GET request for segment #1 above, the proxy cache apparatus 104 may respond with the resource example.com/contents/rep-4/seg-1.3gp. Otherwise, a proxy cache apparatus 104 may respond with the resource corresponding to GET http://example.com/contents/rep-3/seg-1.3gp. If more than one of the identified secondary resources are available in the proxy cache apparatus 104, the proxy cache apparatus may select the resource used in the response according to the q value. A proxy cache apparatus 104 may process the directive of "Connection" header field to move the connection-token, specifically Accept-Alternative-URI header field in this example. The "Connection" header field may be configured to allow the sender, such as a streaming client apparatus 102, to specify options that are desired for a particular connection.

In some example embodiments, a header field, such as an "Accept-Alternative-Representation" header, may be added by a flexible caching module 118 to a request. The example header field may be used to indicate to a proxy cache apparatus 104 that alternative representations in addition to the primary representation are acceptable. The example header field may also include a list of accepted alternative Representation@id values, which in some embodiments a streaming client apparatus 102 may have determined. The syntax of an example "Accept-Alternative-Representation" header field includes but is not limited to:

```
Accept-Alternative-Representation = #URI-Template;
("representationID" "=" representationid-rangespec [accept-
params])
```

-continued

```
URI-Template = http ":" hier-part [ "?" query ] [ "#"
fragment ]
hier-part = "//" authority path-abempty
        / path-absolute-including $representationID$
        / path-rootless-including $representationID$
        / path-empty-including $representationID$
representationid-rangespec = ("*"
            / (representationid-range)
            / (representationid-list)
            )
representationid-range = / ( [representationid] "-" [
representationid])
representationid-list = representationid *(";"
representationid)
representationid = *ALPHA
accept-params = ([OWS ";" OWS "q=" qvalue]
        / [OWS ";" OWS "q=" qvalue-range])
qvalue-range = start-qvalue "-" end-qvalue
```

In some example embodiments, the flexible caching module 118 may use a URI-Template and an representationid-rangespec to construct an alternative URI. The URI-Template may be the same or similar to the primary URI except that it may have a different representationID. In a primary URI, a representationID is typically a certain integer value but may alternatively be any string to be used with a representation-list. In other words, the Representation@id values, which are represented by representationid syntax element in the ABNF syntax above, may be any alphanumeric strings of a certain set of values, such as non-negative integer values. The URI-Template may contain a placeholder for the representationID and a placeholder may appear in the URI-Template as "$representationID$". The flexible caching module 118 may indicate that alternative representation IDs are accepted by using a range or a list of representation IDs. When a range is used, the first given representationid and the second given representationid may indicate the start and end of alternative representation IDs for a continuous range. For use of the representationid-range syntax, an order or sorting of Representation@id values may be specified, such as arranging integer values in ascending order or alphanumeric strings in alphabetical order. The representationid-range syntax may specify all values from the first given representationid until the second given representationid, inclusive, in the specified order or sorting of Representation@id to identify alternative representations. The start alternative representation ID may be larger than, or lower than, the end alternative representation ID. The start and end alternative representation ID may be assigned an associated start-quality value and end-quality value, respectively, which represents the preference of the corresponding boundary representation ID. The quality value of other alternative representation IDs excepting the start and end alternative representation ID can be derived, such as by the flexible caching module 118, by uniformly distributing a quality value between start-quality value and end-quality value. When a list is used, a list of accepting representation IDs can be listed. Each representation ID may be assigned an associated quality value which represents the preference of the representation having such representation ID. The default value is q=1, which indicates the highest preference. On the other hand, q=0 indicates the lowest preference.

An example of Accept-Alternative-Representation with range is given as follows

```
Accept-Alternative-Representation:
http://example.com/contents/rep-$representationID$/seg-
1.3gp; representationID=4-2; q=0.8-0.2
```

The example of Accept-Alternative-Representation with range may be interpreted for example as an instance in which a primary representation was not cached for seg-1.3gp, the streaming client apparatus 102 may then be configured to accept three alternative representations for seg.1.3gp including representations which have an ID equal to 4, 3, or 2 with the preference of 0.8, 0.5, and 0.2, respectively.

In some embodiments, a list based Accept-Representation may include:

```
Accept-Alternative-Representation:
http://example.com/contents/rep-$representationID$/seg-
1.3gp; representationID=5;q=1, representationID=4;q=0.8,
representationID=3;q=0.5
```

The example of Accept-Alternative-Representation may be interpreted as in an instance in which a primary representation was not cached for segment #1, the streaming client apparatus 102 may be configured to, such as by a streaming client apparatus 102 accepts one of the secondary representation IDs #5, #4 and #3 for that segment. In some example embodiments, the streaming client apparatus 102 prefers, such as by the processor 110, the flexible caching module 118 or the like, the segment of representation ID #5, but if the proxy cache apparatus 104 does not cache it, then the proxy cache apparatus 104 can send the segment of representation ID #4 and if that does not exist, the proxy cache apparatus 104 can send the representation ID #3 for segment #1". An example of HTTP GET segment request at a streaming client apparatus 102 using the proposed "Accept-Alternative-Representation" header field is given as follows.

HTTP GET segment #1 request:

```
GET http://example.com/contents/rep-5/seg-1.3gp
Accept-Alternative-Representation:
http://example.com/contents/rep-$representationID$/seg-
1.3gp; representationID=4-3; q=0.8-0.2
```

HTTP GET segment #2 request:

```
GET http://example.com/contents/rep-6/seg-2.3gp
Accept-Alternative-Representation:
http://example.com/contents/rep-$representationID$/seg-
2.3gp; representationID=5; q=0.8
```

The example may be interpreted as a streaming client apparatus 102 requesting, such as by the processor 110, the flexible caching module 118 or the like, a representation ID #5 for segment #1 and representation ID #6 for segment #2, sequentially. For segment #1, the streaming client apparatus 102 indicates that it also accepts alternative representation IDs #4 and #3 in the case of missing representation ID #5. For segment #2, the streaming client apparatus 102 alternatively accepts representation IDs #5, in the case of missing representation ID #6.

In some example embodiments, the URI-template may also contain other placeholders such as those specified in MPEG DASH, namely $Number$ for segment identifier, $Bandwidth$ for the bandwidth of the Representation (which streaming client apparatus 102, may derive, such as by the processor 110, the value of Representation@bandwidth attribute of the desired representation), and $Time$ for the segment time (streaming client apparatus 102, may derive, such as by the processor 110, the segment timeline, particularly the SegmentTimeline@t attribute). In some example embodiments, the values to be inserted in place of the placeholders when resolving a URI from the URI-template are passed within the Accept-Alternative-Representation header similarly to the accepted representation IDs.

In other example embodiments, a header field in a request such as "Accept-Cached-Alternative-Representation" may be specified by a flexible caching module 118. "Accept-Cached-Alternative-Representation" may be used to direct a proxy cache apparatus 104 to reply with a list and range of URIs for the cached alternative resources for agent-driven content negotiation. "Accept-Cached-Alternative-Representation" may also include a secondary URIs' template for searching the cached alternative resources.

The syntax of "Accept-Cached-Alternative-Representation" header field includes but is not limited to:

```
Accept-Cached-Alternative-Representation = #URI-Template;
    URI-Template = http ":" hier-part [ "?" query ] [ "#"
    fragment ]
    hier-part = "//" authority path-abempty
        / path-absolute-including $representationID$
        / path-rootless-including $representationID$
        / path-empty-including $representationID$
```

By way of example, the primary URI in the HTTP GET request may also include an indication including a URI template to request a caching proxy to reply with a list and range of URIs for the cached alternative resources for agent-driven content negotiation. The URI of the primarily requested resource should result when substituting $RepresentationID$ in the URI template with the Representation@id value of the representation that is primarily requested. An example of an HTTP GET segment request at a streaming client apparatus 102 using the proposed "Accept-Cached-Alternative-Representation" header field includes but is not limited to:

```
GET http://example.com/contents/rep-5/seg-1.3gp
Accept-Cached-Alternative-Representation:
http://example.com/contents/rep-$representationID$/seg-
1.3gp;
```

The "Accept-Cached-Alternative-Representation" header field, for example, may be interpreted as a primary representation #5 that is not cached for seg-1.3gp. A streaming client apparatus 102 may request, such as by the processor 110, the communications interface 114, the flexible caching module 118 or like, a proxy cache apparatus 104 to respond all cached secondary URIs, which matches the template specified in an "Accept-Cached-Alternative-Representation" for the alternative resources.

In some example embodiments and as described herein, each media-range in an Accept header may be followed by one or more accept-parameters, beginning with the "q" parameter for indicating a relative quality factor. The first "q" parameter (if any) separates the media-range parameter(s) from the accept-parameters. In some example embodiments, quality factors allow a streaming client apparatus 102 to indicate, such as by the processor 110, the flexible caching module 118 or the like, the relative degree of preference for that media-range, using the q value scale from 0 to 1. In some embodiments the q value may be used to determine selection criteria for an alternative representation.

In some example embodiments, a media type DASH and sub-types representation-x are specified for server-driven content negotiation, they include but are not limited to:
new content type=type/subtype
type=dash
subtype=representation-x
where x can be a integer value or alternatively any string.

In some example embodiments, a Representation of an Adaptation Set may be associated with a content type. A specific content type can be associated with a "q" parameter to indicate the preference of such content type. An example of an adaption set to accept secondary representations using the "Accept" header field include but are not limited to:
"Accept" header field may include
Accept: (dash/representation-x, q=qvalue)

The example accept header field may list one or multiple secondary subtypes that are configured to indicate to a proxy cache apparatus 104 that a streaming client apparatus 102, accepts a particular content type. An embodiment of HTTP GET segment request may include

```
URI = scheme ":" hier-part [ "?" query ]
hier-part = "//" authority path-abempty
    / path-absolute
    / path-rootless
    / path-empty
        query = content-type=dash/representation-x
    Accept: (dash/representation-x, q=qvalue)
```

An example of "Accept" using the defined media type/subtype includes but is not limited to a HTTP GET segment #1 request:

```
GET http://example.com/contents/seg-1.3 gp?content-
type=dash/representation-5
Connection: Accept
Accept: dash/representation-4; q=0.8, dash/representation-3; q=0.6
```

The example may be interpreted as the primary content type that a streaming client apparatus 102 is dash/representation-5 for seg-1.3gp. If the primary content type is not cached by a proxy cache apparatus 104, then a streaming client apparatus 102 may also accept content type dash/representation-4. Otherwise, if content type dash/representation-5 and dash/representation-4 are not cached, then a streaming client apparatus 102 may also accept content type dash/representation-3. Otherwise, (if the primary content type and secondary content type are not cached by a caching proxy), then a proxy cache apparatus 104 may should process the directive of "Connection" header field to move the connection-token, specifically "Accept" header field in this example.

To use the content type based accepting multiple representation method, a proxy cache apparatus 104 may be configured to be aware of the new content type dash/representation-x.

In some embodiments, the subtype may be additionally defined to identify the Adaptation Set, e.g. subtype=adaptation-set-X-representation-Y, which may be used by replacing X and Y with integer values of Adaptation Set ID and Representation ID.

In an embodiment, a "Response-URI" header field for HTTP GET responses may be specified. "Response-URI" may be used to indicate to a streaming client apparatus 102 that an alternative URI is provided due to the missing primary URI at a caching proxy for server-driven content negotiation. The header field may include the selected URI. The syntax and semantics of "Response-URI" header field is specified as follows. In a HTTP response, a status code, such as "208 Alternative Content", may be used in a HTTP response to indicate to a streaming client apparatus 102 that the resource in a response does not include the resource for the primary URI. In a server driven content negotiation case, "Accept-Alternative-URI" or "Accept-Alternative-Representation" should be included in a "Vary" header field to express the parameters the caching proxy server uses to select a representation that is subject to server-driven negotiation.
Response-URI=1#URI URI indicates the URI of responding resources. Response header field "Response-URI" may be used to respond to an HTTP GET request with header field "Accept-Alternative-URI".

In some example embodiments, "Accept-Alternative-URI" and "Response-URI" may be cooperatively used to signal from a streaming client apparatus 102 to a proxy cache apparatus 104 the accepted alternative URIs at a streaming client apparatus 102 and to signal from a streaming client apparatus 102 to a proxy cache apparatus 104 the URI for the resource which is delivered to an streaming client apparatus 102.

"Accept-Alternative-URI" is used by an "Accept-Alternative-URI" aware proxy cache apparatus, such as proxy cache apparatus 104, which may be configured to identify a secondary resource to serve a streaming client apparatus 102 request in a case a proxy cache apparatus 104 cannot determine and/or locate a resource for the primary URI. Specifically, an "Accept-Alternative-URI" header aware caching proxy checks (e.g. sequentially) whether or not a secondary resource, as specified in "Accept-Alternative-URI" header field, is cached by the proxy cache apparatus 104. In a case a secondary resource is delivered to a streaming client apparatus 102, a status code such as "208 Alternative Content" (as described above) may be used in a HTTP response to indicate a streaming client apparatus 102 that the resource in a response is not the resource for the primary URI. In such as case, a new defined "Response-URI" header field is used to indicate the selected URI for the responding resource.

An example of signaling "Accept-Alternative-URI" and "Response-URI" between a streaming client apparatus 102 and a proxy cache apparatus 104 is given as follows.

An example streaming client apparatus 102 HTTP GET segment #1 request may include but is not limited to:

```
GET http://example.com/contents/rep-5/seg-1.3gp
Accept-Alternative-URI: http://example.com/contents/rep-
4/seg-1.3gp; q=0.8,
    http://example.com/contents/rep-3/seg-1.3gp; q=0.6
```

An example Proxy cache apparatus 104 HTTP response includes but is not limited to:

```
HTTP/1.1 208 Alternative Content
DATE: Fri Oct 17 13:00:01 EST 2011
Server: Apache/2.0
Vary: Accept-Alternative-URI
Response-URI: http://example.com/contents/rep-3/seg-1.3gp
```

In some examples, a proxy cache apparatus 104 may check, such as by a processor 110, a flexible caching module 118 or the like, a resource for a primary URI "http://example.com/contents/rep-5/seg-1.3gp." In an instance in which the primary URI is not found, the proxy cache apparatus 104 may sequentially check, such as by a processor 110, a flexible caching module 118 or the like, the resources for the secondary URIs specified in an "Accept-Alternative-URI" header field. In this example, the proxy cache apparatus 104 does not find the resource for "http://example.com/contents/rep-4/seg-1.3gp" and finds the resource for "http://example.com/contents/rep-3/seg-1.3gp". A status code "208 Alternative Content" and header field Response-URI: http://example.com/contents/rep-3/seg-1.3gp may be sent in a HTTP response to inform the streaming client apparatus 102 that the secondary resource is delivered and the selected URI for the secondary resource. In addition, "Vary" header field may include "Accept-Alternative-URI" header field to express the parameters the proxy cache apparatus 104 uses to select a representation that is subject to server-driven negotiation.

In another embodiment, "Accept-Alternative-Representation" and "Response-URI" may be used to signal a proxy cache apparatus 104 the accepted alternative representation IDs and to signal a streaming client apparatus 102 a representation ID used to construct the URI for the secondary resource, which is delivered to the streaming client apparatus 102.

"Accept-Alternative-Representation" may be used in an instance in which a proxy cache apparatus 104 cannot locate a resource for the primary URI by a proxy cache apparatus 104 to construct the secondary URIs. Specifically, one or multiple secondary URI(s) may be constructed by replacing the $representationID$ with the corresponding representationIDs specified in a range or list of representationIDs. A proxy cache apparatus 104 may be configured to sequentially check whether or not a secondary resource, as specified in the constructed secondary URIs, is cached by the proxy cache apparatus 104.

In an instance in which a secondary resource is delivered to a streaming client apparatus 102, a status code such as "208 Alternative Content" may be used in a HTTP response to indicate a streaming client apparatus 102, that the resource in a response is not the resource for the primary URI. In some example embodiments, a "Response-URI" may be included in HTTP header field to indicate the selected URI for the responding resource. In another embodiment, a "Response-Representation" may be included in HTTP header field to indicate the selected representation for the responding resource.

An example streaming client apparatus 102 HTTP GET segment #1 request includes but is not limited to:

```
GET http://example.com/contents/rep-5/seg-1.3gp
Accept-Alternative-Representation:
http://example.com/contents/rep-$representationID$/seg-
1.3gp; representationID=4-3; q=0.8-0.2
```

An example proxy cache apparatus 104 HTTP response may include but is not limited to:

```
HTTP/1.1 208 Alternative Content
DATE: Fri Oct 17 13:00:01 EST 2011
Server: Apache/2.0
Vary: Accept-Alternative-Representation
Response-URI: http://example.com/contents/rep-3/seg-1.3gp
```

In this example, a proxy cache apparatus 104 may be configured to check a resource for the primary URI "http://example.com/contents/rep-5/seg-1.3gp." In an instance in which a primary URI is not found, the proxy cache apparatus 104 may then be configured to construct example secondary URIs http://example.com/contents/rep-4/seg-1.3gp and http://example.com/contents/rep-5/seg-1.3gp using the URI template and representationID specified in a Accept-Alternative-Representation header field. Then the proxy cache apparatus 104 may be configured to sequentially check the resources for the secondary URIs. In this example, the proxy cache apparatus 104 does not find the resource for "http://example.com/contents/rep-4/seg-1.3gp" but finds the resource for "http://example.com/contents/rep-3/seg-1.3gp". So a status code "208 Alternative Content" and header field Response-URI: http://example.com/contents/rep-3/seg-1.3gp may be sent to a streaming client apparatus 102 in a HTTP response to inform the streaming client apparatus 102 that the secondary resource is delivered and the selected URI for the secondary resource. In addition, "Vary" header field may include "Accept-Alternative-Representation" header field to express the parameters the proxy cache apparatus 104 uses to select a representation that is subject to server-driven negotiation.

In some example embodiments, a header field in a request such as "Response-Representation" may be specified, such as by the flexible caching module 118. "Response-Representation" may be configured to indicate to a streaming client apparatus 102, that an alternative representation is being provided by the proxy cache apparatus 104. For example, because the primary representation was not available at a proxy cache apparatus 104, the header field may include the selected Representation@id.

In some example embodiments, the syntax and semantics of "Response-Representation" header field may include a HTTP response, status code such as "208 Alternative Content" which may be used to indicate to a streaming client apparatus 102 that the resource in a response is not the resource for the primary URI. "Accept-Alternative-Representation" should be included in a "Vary" header field to express the parameters the caching proxy server uses to select a representation that is subject to server-driven negotiation.

Response-Representation=1#representationID

In some example embodiments, a RepresentationID may indicate the representation ID of the secondary representation ID. Response header field "Response-Representation" may be used with request header field "Accept-Alternative-Representation."

"Accept-Alternative-Representation" and "Response-Representation" may be cooperatively used to signal a proxy cache apparatus 104 the accepted alternative representation IDs and to signal a streaming client apparatus 102 a representation ID used to construct the URI for the secondary resource.

In some example embodiments, "Accept-Alternative-Representation" may be used in an instance in which a proxy cache apparatus 104 cannot locate, such as by the processor 110, the flexible caching module 118 or the like, a resource for the primary URI by an "Accept-Alternative-Representation" aware caching proxy, such as the proxy cache apparatus 104, to construct the secondary URIs. Specifically, one or multiple secondary URI(s) may be constructed by replacing the $representationID$ with the corresponding representationIDs specified in a range or list of representationIDs. The proxy cache apparatus 104 may then be configured to sequentially determine whether or not a secondary resource, as specified in the constructed secondary URIs, is cached by the proxy cache apparatus 104.

In an instance in which a secondary resource is delivered to a streaming client apparatus 102, a status code such as "208 Alternative Content" may be used in a HTTP response to indicate that the resource in a response is not the resource for the primary URI. In some example embodiments, a "Response-URI" may be included in HTTP header field to indicate the selected URI for the responding resource. In another embodiment, a "Response-Representation" may be included in HTTP header field to indicate the selected representation for the responding resource.

An example of signaling "Accept-Alternative-Representation" and "Response-Representation" between a streaming client apparatus 102 and a proxy cache apparatus 104 is given as follow.

An example streaming client apparatus 102 HTTP GET segment #1 includes but is not limited to:

```
GET http://example.com/contents/rep-5/seg-1.3gp
Accept-Alternative-Representation:
http://example.com/contents/rep-$representationID$/seg-
1.3gp; representationID=4-3; q=0.8-0.2
```

An example proxy cache apparatus 104 HTTP response includes but is not limited to:

```
HTTP/1.1 208 Alternative Content
DATE: Fri Oct 17 13:00:01 EST 2011
Server: Apache/2.0
Vary: Accept-Alternative-Representation
Response-Representation: 3
```

In this example, a "Response-Representation" header field is included in the response header field instead of "Response-URI" and is configured to inform a streaming client apparatus 102 that the secondary resource is delivered and the selected representation ID for the secondary resource. In addition, "Vary" header field include "Accept-Alternative-Representation" header field to express the parameters the proxy cache apparatus 104 uses to select a representation that is subject to server-driven negotiation.

In another embodiment, a header field in a request such as "Cached-Alternative-Representation" may be specified, such as by a flexible caching module 118, which is used to signal a streaming client apparatus 102 with a list and/or a range of URIs for the cached alternative resources for agent-driven content negotiation.

The example syntax of "Cached-Alternative-Representation" header field may include but is not limited to:

```
Cached-Alternative-Representation = #URI-Template;
("representationID" "=" representationid-rangespec)
URI-Template = http ":"hier-part [ "?" query ] [ "#"
fragment ]
hier-part = "//" authority path-abempty
    / path-absolute-including $representationID$
    / path-rootless-including $representationID$
    / path-empty-including $representationID$
representationid-rangespec = ("*"
    / (representationid-range)
    / (representationid-list)
    )
representationid-range = / ( [representationid] "-"
[representationid])
representationid-list = representationid *(","
representationid)
representationid = *ALPHA
```

In some example embodiments, the semantics of the symbols may be equal to the semantics of the symbols specified "Accept-Alternative-Representation". The difference of the header fields "Cached-Alternative-Representation" and "Accept-Alternative-Representation" is that the former signal from a proxy cache apparatus 104 to a streaming client apparatus 102 and the later signal is from a streaming client apparatus 102 to a proxy cache apparatus 104. In addition, the preference of representation on a streaming client apparatus 102 may be included in "Accept-Alternative-Representation"

and the preference of representation at a caching it not included in "Cached-Alternative-Representation".

FIG. 5 illustrates a flowchart according to an example method for operation of streaming client apparatus 102 with respect to server driven content negotiation. In this regard, FIG. 5 illustrates operations that may be performed at the streaming client apparatus 102. The operations illustrated in and described with respect to FIG. 5 may, for example, be performed by, with the assistance of, and/or under the control of one or more of the processor 110, memory 112, communication interface 114, or flexible caching module 118. In some example embodiments, a streaming client apparatus 102 may be configured to specify a primary and secondary representation for a segment (also referred as a resource) for the alternative resources and the corresponding preference. A streaming client apparatus 102 may also be configured to signal a proxy cache apparatus 104 with the primary and secondary representation for a segment in a way that a proxy cache apparatus 104 is configured to derive a primary and secondary URIs for the primary and alternative resources and the corresponding preference.

As is shown in operation 302, a streaming client apparatus 102 is configured to cause a primary URI of the primary representation for a segment to be added in a HTTP request and in operation 303 a template that indicates that the streaming client apparatus 102 is configured to accept representation IDs in an "Accept-Alternative-Representation" header field to specify the secondary representations for a segment. The processor 110, memory 112, and/or flexible caching module 118 may, for example, provide means for performing operations 302 and 303.

In some example embodiments and as is shown in operation 304, the streaming client apparatus 102 may be configured to add a "Accept-Alternative-Representation" in a "Connection" header field to indicate a connection between proxy cache apparatus 104 and the streaming client apparatus 102. The processor 110, memory 112, and/or flexible caching module 118 may, for example, provide means for performing operation 304. In operation 305, a streaming client apparatus 102 may be configured to cause an HTTP request to be transmitted to a proxy cache apparatus 104 or a serving network apparatus 108. The processor 110, memory 112, communication interface 114, user interface 116, and/or flexible caching module 118 may, for example, provide means for performing operation 305.

FIGS. 6a and 6b illustrate flowcharts according to an example method for operation of streaming client apparatus 102 with respect to agent-driven content negotiation. In this regard, FIGS. 6a and 6b illustrate operations that may be performed at the streaming client apparatus 102. The operations illustrated in and described with respect to FIGS. 6a and 6b may, for example, be performed by, with the assistance of, and/or under the control of one or more of the processor 110, memory 112, communication interface 114, or flexible caching module 118. In some example embodiments, a streaming client apparatus 102 may be configured to cause a proxy cache apparatus 104 to reply with a list and range of URIs for cached alternative resources for agent-driven content negotiation. The streaming client apparatus 102 may also be configured to cause a template to be transmitted in an "Accept-Cached-Alternative-Representation" header field to and to cause a proxy cache apparatus 104 to transmit possible representations a streaming client apparatus 102 may accept.

In some example embodiments, an "Accept-Cached-Alternative-Representation" header field may be used with regard to signaling from a streaming client apparatus 102 to a proxy cache apparatus 104 and such signaling may be performed in, but is not limited to: (a) sending an "Accept-Cached-Alternative-Representation" header and (b) receiving a "Cached-Alternative-Representation" header.

As shown in operation 402, a streaming client apparatus 102 may be configured to add a primary URI of the primary representation for a segment in a HTTP request and in operation 403 add a template in an "Accept-Cached-Alternative-Representation" header field to signal a proxy cache apparatus 104 to determine one or more secondary representations for a segment. The processor 110, memory 112, and/or flexible caching module 118 may, for example, provide means for performing operations 402 and 403. Then in operation 404, a streaming client apparatus 102 may cause a HTTP request to be transmitted to a proxy cache apparatus 104 or a serving network apparatus 108. The processor 110, memory 112, communication interface 114, user interface 116, and/or flexible caching module 118 may, for example, provide means for performing operation 404.

As shown in operation 412, a streaming client apparatus 102 may be configured to receive a "Cached-Alternative-Representation" from a proxy cache apparatus 104. The processor 110, memory 112, communication interface 114, and/or flexible caching module 118 may, for example, provide means for performing operation 412. As is shown in operation 413, a streaming client apparatus 102 may be configured to parse a "Cached-Alternative-Representation" to derive cached representations for a segment at a proxy cache apparatus 104, and at operation 414, the streaming client apparatus 102 may conclude a best or advantageous representation for a segment and further may cause a GET segment request to be transmitted for a segment. The processor 110, memory 112, communication interface 114, user interface 116, and/or flexible caching module 118 may, for example, provide means for performing operations 413 and 414.

FIG. 7 illustrates a flowchart according to an example method for operation of a proxy cache apparatus 104 for server-driven content negotiation. In this regard, FIG. 7 illustrates operations that may be performed at the proxy cache apparatus 104. The operations illustrated in and described with respect to FIG. 7 may, for example, be performed by, with the assistance of, and/or under the control of one or more of the processor 110, memory 112, communication interface 114, or flexible caching module 118. A proxy cache apparatus 104 may be configured to determine a primary and/or secondary URIs for alternative resources and the corresponding preference by a streaming client apparatus 102 by using the proposed signaling, such as "Accept-Alternative-URI" header field and "Accept-Alternative-Representation" header field. As will be appreciated, other similar headers or directives too which can be used to specify secondary URIs for the alternative resources.

In some example embodiments, a proxy cache apparatus 104 may be configured to determine whether to cache resources for the primary and/or the secondary URI and further may be configured to select a high priority resource which is cached by the proxy cache apparatus 104. In an instance in which a secondary resource for the primary and secondary URI is not located, a proxy cache apparatus 104 causes a request, such as a HTTP request, to be transmitted to a serving network apparatus 108 or another proxy cache which may cache the primary or secondary resources.

As is shown in operation 502 and in an instance in which a proxy cache apparatus 104 receives a HTTP GET segment request from a user agent and in an instance in which the requested primary resource is cached by a proxy cache apparatus 104 as is shown in operation 503, a proxy cache apparatus 104 may be configured to cause the primary resource to be transmitted to the streaming client apparatus 102. In some example embodiments and as is shown in operation 505, after causing the transmission in operation 504, a proxy cache apparatus 104 may be configured to cache the received segment in an instance in which it was not already cached. The processor 110, memory 112, communication interface 114, and/or flexible caching module 118 may, for example, provide means for performing operations 502-505.

In an instance in which the proxy cache apparatus 104 receives a HTTP GET segment request from a streaming client apparatus 102 and in an instance in which the requested primary resource identified by a primary URI is not cached by a caching proxy, then a proxy cache apparatus 104 may be configured to determine whether or not "Accept-Alternative-Representation" is included in a header field. See operation 506. If "Accept-Alternative-Representation" is included in a header field, then, as shown in operation 507, a proxy cache apparatus 104 may be configured to construct the secondary URIs for the alternative resources and, as is shown in operation 508, sequentially check whether or not a secondary URI's resource is cached by a proxy cache apparatus 104 from a high preference to a low preference as indicated by an "Accept-Alternative-Representation". In an instance in which a resource associated with on the secondary URIs is cached by a caching proxy at operation 509, then a proxy cache apparatus 104 may be configured to cause an alternative segment to be transmitted to a streaming client apparatus 102 in a response immediately or after a predetermined period amount of time. See operation 510. The processor 110, memory 112, communication interface 114, and/or flexible caching module 118 may, for example, provide means for performing operations 510, and 506-509.

In some example embodiments and as shown in operation 511, a proxy cache apparatus 104 may be configured to add a selected representation ID in a "Response-Representation" response header field or add the selected secondary URI in a "response-URI" response header field, which is delivered to a streaming client apparatus 102. Alternatively or additionally, a proxy cache apparatus 104 may include "Accept-Alternative-Representation" header field name in a "Vary" header field to express the parameters to select a representation that is subject to server-driven negotiation. The processor 110, memory 112, communication interface 114, and/or flexible caching module 118 may, for example, provide means for performing operation 511.

As is shown in operation 512, a proxy cache apparatus 104 may request and cache the requested segment identified by a primary URI from a remote location if the requested segment is not currently being caused to be retrieved and/or fetched from a remote location and to serve future request after responding to a streaming client apparatus 102 request with an alternative resource. Alternatively or additionally a proxy cache apparatus 104 may cause a requested segment from a remote location to be requested in an instance in which a number of HTTP GET requests are received in a certain time interval that exceed a predetermined duration, and the requested segment is not being fetched from a remote location. The processor 110, memory 112, communication interface 114, and/or flexible caching module 118 may, for example, provide means for performing operation 512.

In an instance in which a "Accept-Alternative-Representation" header field is not found or a proxy cache apparatus 104 is not aware of the new defined header field of HTTP in operation 506 or any of secondary URI's resource is not cached by a proxy cache apparatus 104 in operation 509, then at operation 513, a proxy cache apparatus 104 may be configured to remove "Accept-Alternative-Representation" as indicated in connection header field. Then, at operation 514, a proxy cache apparatus 104 may determine whether the requested segment is currently being fetched from a remote location. If the requested segment is not currently being fetched then at operation 515, the proxy cache apparatus 104 cause the requested segment to be retrieved from one or multiple remote locations and may then cause the requested segment to be transmitted to a streaming client apparatus 102. Otherwise, if the requested segment is not fully cached by a proxy cache apparatus 104 but is currently being retrieved from a remote location as shown in operation 514, then a proxy cache apparatus 104 may cause the requested segment to be transmitted to a streaming client apparatus 102 as is shown in operation 504. If the requested segment is not cached by a proxy cache apparatus 104, then the proxy cache apparatus 104 may be configured to cache the segment at operation 505 and ends a caching proxy operation for server-driven content negotiation in DASH at operation 516. The processor 110, memory 112, communication interface 114, and/or flexible caching module 118 may, for example, provide means for performing operations 506, 509, and 513-516.

FIG. 8 illustrates a flowchart according to an example method for operation of a proxy cache apparatus 104 for agent-driven content negotiation. In this regard, FIG. 8 illustrates operations that may be performed at the proxy cache apparatus 104. The operations illustrated in and described with respect to FIG. 8 may, for example, be performed by, with the assistance of, and/or under the control of one or more of the processor 110, memory 112, communication interface 114, or flexible caching module 118. In some example embodiments, a proxy cache apparatus 104 may be configured to analyze possible candidate URIs that are cached a proxy cache apparatus 104 using the signaling, such as "Accept-Alternative-URI" header field and "accept" defined media type. Other similar headers or directives may be used to derive URI templates for a secondary URI for an alternative resource.

As is shown in operation 602 and in an instance in which a HTTP GET segment request is received from a streaming client apparatus 102 and the requested primary resource was cached by a proxy cache apparatus 104, as shown in operation 603, a proxy cache apparatus 104 may be configured to cause a primary resource to be transmitted to a streaming client apparatus 102. In some example embodiments, a proxy cache apparatus 104 caches the received segment in an instance in which the received segment is not already cached. See operation 605. The processor 110, memory 112, communication interface 114, and/or flexible caching module 118 may, for example, provide means for performing operations 602-605.

In an instance in which a proxy cache apparatus 104 receives a HTTP GET segment request from a streaming client apparatus 102 and the requested primary resource identified by a primary URI is not cached as is shown in operation 603. As is shown in operation 606, a proxy cache apparatus 104 may be configured to determine whether "Accept-Cached-Alternative-Representation" is included in a header field. If Accept-Cached-Alternative-Representation" is included in a header field, then as is shown in operation 607, a proxy cache apparatus 104 may be configured to parse a URI template for the alternative resources from "Accept-Cached-Alternative-Representation" and as shown in operation 608, proxy cache apparatus 104 may locate cached alternative resources that matches the URI template of the secondary resources. See operation 609. The processor 110, memory 112, communication interface 114, and/or flexible caching module 118 may, for example, provide means for performing operations 606-609.

As shown in operation 610, in an instance in which a proxy cache apparatus 104 determines one or multiple such alternative resources' URI, then the proxy cache apparatus 104 may be configured add all the matching URIs in a "Cached-Alternative-Representation" response header field and further may cause it to be transmitted to a streaming client apparatus 102. In an instance in which "Accept-Cached-Alternative-Representation" header field is not found, a proxy cache apparatus 104 is not aware of the new defined header field of HTTP, or no such as cached alternative resources' URI is found, then at operation 611, a proxy cache apparatus 104 may be configured to remove "Accept-Cached-Alternative-Representation" as indicated in connection header field. Then, as shown in operation 612, a proxy cache apparatus 104 may be configured to determine whether the requested segment is already being fetched from a remote location. If it the requested segment is not being fetched, then at operation 613, a proxy cache apparatus 104 may be configured to fetch the requested segment from one or multiple remote locations and further may cause the requested segment to be transmitted to a streaming client apparatus 102. As is shown in operation 614, if the requested segment is not cached by a proxy cache apparatus 104, the proxy cache apparatus 104 may cache the segment. The processor 110, memory 112, communication interface 114, and/or flexible caching module 118 may, for example, provide means for performing operations 610-614.

FIG. 9 illustrates a flowchart according to an example method for operation of streaming client apparatus 102 for server driven content negotiation. See also for example FIG. 5. As shown in operation 902, the apparatus 300 that is embodied, for example, by the streaming client apparatus 102 may include means, such as the processor 110, the communications interface 114, the flexible caching module 118 or the like, for causing a request for at least one of a primary representation for a segment or an alternative representation for the segment to be transmitted to a proxy cache apparatus, wherein the proxy cache apparatus is configured to derive a primary URI for the primary representation and at least one secondary URI for the alternative representation and corresponding preferences. As shown in operation 904, the apparatus 300 that is embodied, for example, by the streaming client apparatus 102 may include means, such as the processor 110, the flexible caching module 118 or the like, for determining the primary URI of the primary representation for the segment to be transmitted to the proxy cache apparatus. As shown in operation 906, the apparatus 300 that is embodied, for example, by the streaming client apparatus 102 may include means, such as the processor 110, the flexible caching module 118 or the like, for causing a template that specifies the alternative representation URI for the segment to be created, wherein the template comprises an indication to accept an alternative representation of the segment. In some example embodiments, a connection header field is configured to provide an indication of one or more URIs that are permitted as responses from the proxy cache apparatus. In further example embodiments, the alternative representation is a representation that is cached by the proxy cache apparatus and is configured to be an alternative to the primary representation.

As shown in operation 908, the apparatus 300 that is embodied, for example, by the streaming client apparatus 102 may include means, such as the processor 110, the communications interface 114, the flexible caching module 118 or the like, for causing the proxy cache apparatus 104 to respond with at least one of the primary representation or the alternative representation based on the caching status at a proxy cache apparatus, wherein the proxy cache apparatus 104 is configured to determine whether the request enables an alternative representation to be included in a response. As shown in operation 908, the apparatus 300 that is embodied, for example, by the streaming client apparatus 102 may include means, such as the processor 110, the communications interface 114, the flexible caching module 118 or the like, for receiving at least one of the primary representation or the alternative representation for the segment from the proxy cache apparatus.

FIG. 10 illustrates a flowchart according to an example method for operation of streaming client apparatus 102 with respect to agent-driven content negotiation. See also for example FIG. 6. As shown in operation 1002, the apparatus 300 that is embodied, for example, by the streaming client apparatus 102 may include means, such as the processor 110, the communications interface 114, the flexible caching module 118 or the like, for causing a request for a proxy cache apparatus to provide a selectable cached alternative representation URI to be transmitted. As shown in operation 1004, the apparatus 300 that is embodied, for example, by the streaming client apparatus 102 may include means, such as the processor 110, the communications interface 114, the flexible caching module 118 or the like, for causing a primary URI of a primary representation for a segment to be transmitted in the request.

As shown in operation 1006, the apparatus 300 that is embodied, for example, by the streaming client apparatus 102 may include means, such as the processor 110, the flexible caching module 118 or the like, for causing a template that specifies the secondary representation URI for the segment to be created, wherein the template comprises an indication to accept secondary representation of the segment. As shown in operation 1008, the apparatus 300 that is embodied, for example, by the streaming client apparatus 102 may include means, such as the processor 110, the communications interface 114, the flexible caching module 118 or the like, for receiving a list and range of URI's for the selectable cached alternative representation for agent driven content negotiation. As shown in operation 1010, the apparatus 300 that is embodied, for example, by the streaming client apparatus 102 may include means, such as the processor 110, the communications interface 114, the flexible caching module 118 or the like, for causing a request for a resource of the selectable cached alternative representation for agent driven content negotiation to be transmitted, wherein the resource is requested based on a predetermined selection criteria. In some example embodiments, the request is transmitted to at least one of a proxy cache apparatus 104 or a serving network apparatus.

In some example embodiments, the apparatus 300 that is embodied, for example, by the streaming client apparatus 102 may include means, such as the processor 110, the communications interface 114, the flexible caching module 118 or the like, for receiving a message from the proxy cache apparatus; determining the one or more selectable cached alternative representations are available from the proxy cache apparatus based on the received message and causing at least one of the one or more cached alternative representations to be requested, wherein the resource is requested based on a predetermined selection criteria.

FIG. 11 illustrates a flowchart according to an example method for operation of proxy cache apparatus 104 for server-driven content negotiation. See also for example FIG. 7. As shown in operation 1102, the apparatus 300 that is embodied, for example, by the proxy cache apparatus 104 may include means, such as the processor 110, the communications interface 114, the flexible caching module 118 or the like, for receiving a request for at least one of a primary representation or an alternative representation for a segment. As shown in operation 1104, the apparatus 300 that is embodied, for example, by the proxy cache apparatus 104 may include means, such as the processor 110, the flexible caching module 118 or the like, for determining whether the request comprises an indication that a client will accept the alternative representation of the segment. As shown in operation 1106, the apparatus 300 that is embodied, for example, by the proxy cache apparatus 104 may include means, such as the processor 110, the flexible caching module 118 or the like, for determining whether at least one of a primary URI associated with the primary representation is cached.

As shown in operation 1108, the apparatus 300 that is embodied, for example, by the proxy cache apparatus 104 may include means, such as the processor 110, the flexible caching module 118 or the like, for determining a secondary URI for the alternative representation in an instance in which the request comprises an indication that the streaming client apparatus will accept the alternative representation of the segment and the primary URI is not cached. As shown in operation 1110, the apparatus 300 that is embodied, for example, by the proxy cache apparatus 104 may include means, such as the processor 110, the flexible caching module 118 or the like, for determining whether the alternative representation that is associated with the secondary URI is cached.

As shown in operation 1112, the apparatus 300 that is embodied, for example, by the proxy cache apparatus 104 may include means, such as the processor 110, the communications interface 114, the flexible caching module 118 or the like, for causing the primary representation of the segment to be requested in an instance in which the secondary URI is not cached. As shown in operation 1114, the apparatus 300 that is embodied, for example, by the proxy cache apparatus 104 may include means, such as the processor 110, the communications interface 114, the flexible caching module 118 or the like, for causing the alternative representation of the segment to be transmitted in an instance in which the secondary URI is cached. As shown in operation 1116, the apparatus 300 that is embodied, for example, by the proxy cache apparatus 104 may include means, such as the processor 110, the communications interface 114, the flexible caching module 118 or the like, for causing the primary representation of the segment to be transmitted in an instance in which the primary URI is cached.

In some example embodiments, the apparatus 300 that is embodied, for example, by the proxy cache apparatus 104 may include means, such as the processor 110, the communications interface 114, the flexible caching module 118 or the like, for determining a cached alternative representation to cause to be transmitted, wherein the determination is based on a predetermined selection criteria and causing the primary representation associated with the primary URI to be requested in an instance in which it is not cached.

FIG. 12 illustrates a flowchart according to an example method for operation of proxy cache apparatus 104 for agent-driven content negotiation. See also for example FIG. 8. As shown in operation 1202, the apparatus 300 that is embodied, for example, by the proxy cache apparatus 104 may include means, such as the processor 110, the communications interface 114, the flexible caching module 118 or the like, for receiving a request for at least one of a primary representation or an alternative representation for a segment. As shown in operation 1204, the apparatus 300 that is embodied, for example, by the proxy cache apparatus 104 may include means, such as the processor 110, the flexible caching module 118 or the like, for determining whether the request comprises an indication that a client will accept the alternative representation of the segment. As shown in operation 1206, the apparatus 300 that is embodied, for example, by the proxy cache apparatus 104 may include means, such as the processor 110, the communications interface 114, the flexible caching module 118 or the like, for causing a list and range of URI's for a selectable cached alternative representation for agent driven content negotiation to be transmitted.

As shown in operation 1208, the apparatus 300 that is embodied, for example, by the proxy cache apparatus 104 may include means, such as the processor 110, the flexible caching module 118 or the like, for determining whether at least one of a primary URI associated with the primary representation is cached. As shown in operation 1210, the apparatus 300 that is embodied, for example, by the proxy cache apparatus 104 may include means, such as the processor 110, the communications interface 114, the flexible caching module 118 or the like, for causing the primary representation of the segment to be transmitted in an instance in which the primary URI is cached.

As shown in operation 1212, the apparatus 300 that is embodied, for example, by the proxy cache apparatus 104 may include means, such as the processor 110, the communications interface 114, the flexible caching module 118 or the like, for receiving a template that specifies the secondary representation URI for the segment to be created, wherein the template comprises an indication to accept secondary representation of the segment and in some embodiments parsing the template. As shown in operation 1214, the apparatus 300 that is embodied, for example, by the proxy cache apparatus 104 may include means, such as the processor 110, the flexible caching module 118 or the like, for determining at least one alternative representation that is associated with the secondary representation URI in the received template. As shown in operation 1214, the apparatus 300 that is embodied, for example, by the proxy cache apparatus 104 may include means, such as the processor 110, the communications interface 114, the flexible caching module 118 or the like, for receiving a request for a resource of the selectable cached alternative representation for agent driven content negotiation.

In some example embodiments, the apparatus 300 that is embodied, for example, by the proxy cache apparatus 104 may include means, such as the processor 110, the communications interface 114, the flexible caching module 118 or the like, for causing one or more selectable cached alternative representations to be transmitted and receiving a request for at least one of the one or more cached alternative representations.

FIGS. 5-12 illustrate flowcharts of a system, method, and computer program product according to example embodiments of the invention. It will be understood that each block of the flowchart, and combinations of blocks in the flowchart, may be implemented by various means, such as hardware and/or a computer program product comprising one or more computer-readable mediums (as opposed to a computer-readable transmission medium which describes a propagating signal) having one or more computer program code instructions, program instructions, or executable computer-readable program code instructions stored therein. For example, one or more of the procedures described herein may be embodied by computer program instructions of a computer program product. In this regard, the computer program product(s) that embodies the procedures described herein may be stored by one or more memory devices (e.g., memory 112, volatile memory 40, or non-volatile memory 42) of a mobile terminal, server, or other computing device (e.g., the streaming client apparatus 102) and executed by a processor (e.g., the processor 110 or processor 20) in the computing device. In some embodiments, the computer program instructions comprising the computer program product(s) that embodies the procedures described above may be stored by memory devices of a plurality of computing devices. As will be appreciated, any such computer program product may be loaded onto a computer or other programmable apparatus to produce a machine, such that the computer program product including the instructions which execute on the computer or other programmable apparatus creates means for implementing the functions specified in the flowchart block(s).

Further, the computer program product may comprise one or more computer-readable memories on which the computer program instructions may be stored such that the one or more computer-readable memories can direct a computer or other programmable apparatus to function in a particular manner, such that the computer program product may comprise an article of manufacture which implements the function specified in the flowchart block(s). The computer program instructions of one or more computer program products may also be loaded onto a computer or other programmable apparatus to cause a series of operations to be performed on the computer or other programmable apparatus to produce a computer-implemented process such that the instructions which execute on the computer or other programmable apparatus provide operations for implementing the functions specified in the flowchart block(s). Retrieval, loading, and execution of the program code instructions may be performed sequentially such that one instruction is retrieved, loaded, and executed at a time. In some example embodiments, retrieval, loading and/or execution may be performed in parallel such that multiple instructions are retrieved, loaded, and/or executed together.

Accordingly, execution of instructions associated with the operations of the flowchart by a processor, or storage of instructions associated with the blocks or operations of the flowchart in a computer-readable storage medium, support combinations of operations for performing the specified functions. It will also be understood that one or more operations of the flowchart, and combinations of blocks or operations in the flowchart, may be implemented by special purpose hardware-based computer systems and/or processors which perform the specified functions, or combinations of special purpose hardware and program code instructions.

In various embodiments described herein, a URI template scheme may be used primarily for representation IDs. It is noted that any other URI template scheme may be used similarly with various embodiments. Placeholders other than $RepresentationID$ may be additionally or alternatively present in the URI template scheme. In various embodiments above, a local HTTP cache located in the same device as a streaming client apparatus 102 may also be used. A local HTTP cache may operate similarly to the proxy cache apparatus 104 described in various embodiments. However, in the case that a local HTTP cache cannot serve the primary or secondary resource requested in an HTTP GET request, the local HTTP cache may leave the Connection header unresolved and hence not remove headers related to the alternative resources as specified in various embodiments.

Various embodiments of the present invention have been described to include URIs or URI templates in requests and/or responses, where the URI or URI template indicates a segment in a representation announced in an MPD. In these embodiments a URI or URI template could alternatively or additionally specify a sub-segment, i.e. a part of a segment, typically a single byte range within a segment. A sub-segment may contain such a part of a segment that it can be processed by a streaming client apparatus 102 prior to receiving subsequent sub-segments of the same segment. A sub-segment may be determined for example during preparing the content and indicated through one or more Segment Index boxes included in the segment. A streaming client apparatus may receive and parse one or more Segment Index boxes of a segment and determine sub-segments and their URIs or URI templates accordingly. A URI or URI template for a sub-segment may contain the URI or URI template, respectively, of the segment and a byte range part specifying the sub-segment.

The various embodiments of the present invention provide many advantages over the current art. Some example embodiments more segments are fetched from a proxy cache instead of remote location. Consequently, bandwidth (in the network between proxy cache and origin server) is saved. In other embodiments, advantageously DASH clients are likely to make fewer incorrect rate adaptation decisions and more consistently request the same representation level and hence provide a more stable quality to end-users. Further embodiments described herein are configured to reduce the delay to fetch segments at the client, therefore resulting in fewer interruptions/re-bufferings.

The above described functions may be carried out in many ways. For example, any suitable means for carrying out each of the functions described above may be employed to carry out embodiments of the invention. In example embodiments, a suitably configured processor (for example, the processor 110) may provide all or a portion of the elements of the invention. In other embodiments, all or a portion of the elements of the invention may be configured by and operate under control of a computer program product. The computer program product for performing the methods of embodiments of the invention may comprise a computer-readable storage medium, such as the non-volatile storage medium (for example, the memory 112), and computer-readable program code portions, such as a series of computer instructions, embodied in the computer-readable storage medium.

Many modifications and other embodiments of the inventions set forth herein will come to mind to one skilled in the art to which these inventions pertain having the benefit of the teachings presented in the foregoing descriptions and the associated drawings. Therefore, it is to be understood that the embodiments of the invention are not to be limited to the specific embodiments disclosed and that modifications and other embodiments are intended to be included within the scope of the appended claims. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions other than those explicitly described above are also contemplated as may be set forth in some of the appended claims. Although specific terms are employed herein, they are used in a generic and descriptive sense only and not for purposes of limitation.

That which is claimed:

1. A method comprising:
causing, using a processor, a request for a primary representation for a segment and an alternative representation for the segment to be transmitted to a proxy cache apparatus, wherein the request comprises at least a uniform resource indicator of the primary representation for the segment and a uniform resource indicator of the alternative representation for the segment;

creating a template that specifies the alternative representation uniform resource indicator for the segment, where in the template comprises an indication to accept an alternative representation of the segment;

causing the template to be included in the request, wherein a connection header field is configured to provide an indication that in an instance in which the proxy cache apparatus forwards the request, the proxy cache apparatus is configured to remove the uniform resource indicator of the alternative representation; and receiving at least one of the primary representation or the alternative representation from the proxy cache apparatus based at least in part on the request.

2. A method according to claim 1, further comprising:

determining a primary uniform resource indicator of the primary representation for the segment to be transmitted to the proxy cache apparatus in the request.

3. A method according to claim 1, further comprising:

including a uniform resource indicator of the primary representation for the segment into the request and including a uniform resource indicator of the alternative representation for the segment into the request.

4. A method according to claim 1, wherein the alternative representation is a representation that is cached by the proxy cache apparatus and is configured to be an alternative to the primary representation.

5. A method according to claim 1, wherein the proxy cache apparatus is configured to derive a primary uniform resource indicator for the primary representation and at least one secondary uniform resource indicator for the alternative representation and corresponding preferences.

6. An apparatus comprising:

at least one processor; and at least one memory including computer program code, the at least one memory and the computer program code configured to, with the at least one processor, cause the apparatus to at least:

cause a request for a primary representation for a segment and an alternative representation for the segment to be transmitted to a proxy cache apparatus, wherein the request comprises at least a uniform resource indicator of the primary representation for the segment and a uniform resource indicator of the alternative representation for the segment;

create a template that specifies the alternative representation uniform resource indicator for the segment, where in the template comprises an indication to accept an alternative representation of the segment;

cause the template to be included in the request, wherein a connection header field is configured to provide an indication that in an instance in which the proxy cache apparatus forwards the request, the proxy cache apparatus is configured to remove the uniform resource indicator of the alternative representation; and receive at least one of the primary representation or the alternative representation from the proxy cache apparatus based at least in part on the request.

7. An apparatus according to claim 6, wherein the at least one memory including the computer program code is further configured to, with the at least one processor, cause the apparatus to:

determine a primary uniform resource indicator of the primary representation for the segment to be transmitted to the proxy cache apparatus in the request.

8. An apparatus according to claim 6, wherein the at least one memory including the computer program code is further configured to, with the at least one processor, cause the apparatus to:

include a uniform resource indicator of the primary representation for the segment into the request and including a uniform resource indicator of the alternative representation for the segment into the request.

9. An apparatus according to claim 6, wherein the alternative representation is a representation that is cached by the proxy cache apparatus and is configured to be an alternative to the primary representation.

10. An apparatus according to claim 6, wherein the proxy cache apparatus is configured to derive a primary uniform resource indicator for the primary representation and at least one secondary uniform resource indicator for the alternative representation and corresponding preferences.

11. A method comprising:

causing a request for a proxy cache apparatus to provide a selectable cached alternative representation uniform resource indicator to be transmitted, wherein the request comprises at least a uniform resource indicator of the primary representation for the segment and a uniform resource indicator of the alternative representation for the segment;

creating a template that specifies the alternative representation uniform resource indicator for the segment, where in the template comprises an indication to accept an alternative representation of the segment;

causing the template to be included in the request, wherein a connection header field is configured to provide an indication that in an instance in which the proxy cache apparatus forwards the request, the proxy cache apparatus is configured to remove the uniform resource indicator of the alternative representation; and receiving a list or range of uniform request indicators for a selectable cached alternative representation for agent driven content negotiation; and causing, using a processor, a request for a resource of the selectable cached alternative representation for agent driven content negotiation to be transmitted, wherein the resource is requested based on a predetermined selection criteria.

12. A method according to claim 11, further comprising:

causing a primary uniform resource indicator of a primary representation for a segment to be transmitted in the request; and causing a template that specifies a secondary representation uniform resource indicator for the segment to be created, wherein the template comprises an indication to accept secondary representation of the segment.

13. A method according to claim 11, wherein the request is transmitted to at least one of the proxy caching apparatus or a serving network apparatus.

14. A method according to claim 11, further comprising:

receiving a message from the proxy cache apparatus;

determining one or more selectable cached alternative representations that are available from the proxy cache apparatus based on the message; and causing at least one of the one or more selectable cached alternative representations to be requested, wherein the resource is requested based on a predetermined selection criteria.

15. An apparatus comprising:
at least one processor; and
at least one memory including computer program code, the at least one memory and the computer program code configured to, with the at least one processor, cause the apparatus to at least:
cause a request for a proxy cache apparatus to provide a selectable cached alternative representation uniform resource indicator to be transmitted, wherein the request comprises at least a uniform resource indicator of the primary representation for the segment and a uniform resource indicator of the alternative representation for the segment;
create a template that specifies the alternative representation uniform resource indicator for the segment, where in the template comprises an indication to accept an alternative representation of the segment;
cause the template to be included in the request, wherein a connection header field is configured to provide an indication that in an instance in which the proxy cache apparatus forwards the request, the proxy cache apparatus is configured to remove the uniform resource indicator of the alternative representation;
receive a list or range of uniform request indicators for a selectable cached alternative representation for agent driven content negotiation; and
cause a request for a resource of the selectable cached alternative representation for agent driven content negotiation to be transmitted, wherein the resource is requested based on a predetermined selection criteria.

16. An apparatus according to claim 15, wherein the at least one memory including the computer program code is further configured to, with the at least one processor, cause the apparatus to:
cause a primary uniform resource indicator of a primary representation for a segment to be transmitted in the request; and
cause a template that specifies a secondary representation uniform resource indicator for the segment to be created, wherein the template comprises an indication to accept secondary representation of the segment.

17. An apparatus according to claim 15, wherein the request is transmitted to at least one of the proxy caching apparatus or a serving network apparatus.

18. An apparatus according to claim 15, wherein the at least one memory including the computer program code is further configured to, with the at least one processor, cause the apparatus to:
receive a message from the proxy cache apparatus;
determine one or more selectable cached alternative representations that are available from the proxy cache apparatus based on the message; and
cause at least one of the one or more selectable cached alternative representations to be requested, wherein the resource is requested based on a predetermined selection criteria.

19. A method comprising:
receiving a request for a primary representation and an alternative representation for a segment, wherein the request comprises at least a uniform resource indicator of the primary representation for the segment and a uniform resource indicator of the alternative representation for the segment, wherein the request comprises a template that specifies the alternate representation uniform resource indicator for the segment, wherein the template comprises an indication to accept the alternative representation of the segment, wherein a connection header field is configured to provide an indication that in an instance in which the proxy cache apparatus forwards the request, the proxy/cache apparatus is configured to remove the uniform resource indicator of the alternative representation;
determining whether the request comprises an indication that a streaming client apparatus will accept the alternative representation of the segment;
determining, using a processor, whether at least one of a primary uniform resource indicator associated with the primary representation is cached; and
causing the primary representation of the segment to be transmitted in an instance in which the primary uniform resource indicator is cached.

20. A method according to claim 19, further comprising:
determining a secondary uniform resource indicator for the alternative representation in an instance in which the request comprises an indication that the streaming client apparatus will accept the alternative representation of the segment and the primary uniform resource indicator is not cached.

21. A method according to claim 19, further comprising:
determining whether the alternative representation that is associated with a secondary uniform resource indicator is cached;
causing the primary representation of the segment to be requested in an instance in which the secondary uniform resource indicator is not cached; and
causing the alternative representation of the segment to be transmitted in an instance in which the secondary uniform resource indicator is cached.

22. A method according to claim 19, further comprising:
determining a cached alternative representation to be transmitted based on a predetermined selection criteria.

23. A method according to claim 19, further comprising:
causing the primary representation associated with the primary uniform resource indicator to be requested in an instance in which it is not cached.

24. An apparatus comprising:
at least one processor; and
at least one memory including computer program code, the at least one memory and the computer program code configured to, with the at least one processor, cause the apparatus to at least:
receive a request for a primary representation and an alternative representation for a segment, wherein the request comprises at least a uniform resource indicator of the primary representation for the segment and a uniform resource indicator of the alternative representation for the segment, wherein the request comprises a template that specifies the alternate representation uniform resource indicator for the segment, wherein the template comprises an indication to accept the alternative representation of the segment, wherein a connection header field is configured to provide an indication that in an instance in which the proxy cache apparatus forwards the request, the proxy cache apparatus is configured to remove the uniform resource indicator of the alternative representation;
determine whether the request comprises an indication that a streaming client apparatus will accept the alternative representation of the segment;
determine whether at least one of a primary uniform resource indicator associated with the primary representation is cached; and cause the primary representation of the segment to be transmitted in an instance in which the primary uniform resource indicator is cached.

25. An apparatus according to claim 24, wherein the at least one memory including the computer program code is further configured to, with the at least one processor, cause the apparatus to:
determine a secondary uniform resource indicator for the alternative representation in an instance in which the request comprises an indication that the streaming client apparatus will accept the alternative representation of the segment and the primary uniform resource indicator is not cached.

26. An apparatus according to claim 24, wherein the at least one memory including the computer program code is further configured to, with the at least one processor, cause the apparatus to:
determine whether the alternative representation that is associated with a secondary uniform resource indicator is cached;
cause the primary representation of the segment to be requested in an instance in which the secondary uniform resource indicator is not cached; and
cause the alternative representation of the segment to be transmitted in an instance in which the secondary uniform resource indicator is cached.

27. An apparatus according to claim 24 wherein the at least one memory including the computer program code is further configured to, with the at least one processor, cause the apparatus to:
determine a cached alternative representation to be transmitted based on a predetermined selection criteria.

28. An apparatus according to claim 24, wherein the at least one memory including the computer program code is further configured to, with the at least one processor, cause the apparatus to:
cause the primary representation associated with the primary uniform resource indicator to be requested in an instance in which it is not cached.

29. A method comprising:
receiving a request for a primary representation and an alternative representation for a segment, wherein the request comprises at least a uniform resource indicator of the primary representation for the segment and a uniform resource indicator of the alternative representation for the segment, wherein the request comprises a template that specifies the alternate representation uniform resource indicator for the segment, wherein the template comprises an indication to accept the alternative representation of the segment, wherein a connection header field is configured to provide an indication that in an instance in which the proxy cache apparatus forwards the request, the proxy cache apparatus is configured to remove the uniform resource indicator of the alternative representation;
determining, using a processor, whether the request comprises an indication that a streaming client apparatus will accept the alternative representation of the segment;
causing a list and range of uniform resource indicators for a selectable cached alternative representation for agent driven content negotiation to be transmitted; and
receiving a request for a resource of the selectable cached alternative representation for agent driven content negotiation.

30. A method according to claim 29, further comprising:
determining whether at least one of a primary uniform resource indicator associated with the primary representation is cached; and
causing the primary representation of the segment to be transmitted in an instance in which the primary uniform resource indicator is cached.

31. A method according to claim 29, further comprising:
causing one or more selectable cached alternative representations to be transmitted; and
receiving a request for at least one of the one or more selectable cached alternative representations.

32. A method according to claim 29, further comprising:
receiving a template that specifies a secondary uniform resource indicator for an alternative representation for the segment to be created, wherein the template comprises an indication to accept secondary representation of the segment;
causing the template to be parsed; and
determining at least one alternative representation that is associated with the secondary uniform resource indicator in a received template.

33. An apparatus comprising:
at least one processor; and
at least one memory including computer program code, the at least one memory and the computer program code configured to, with the at least one processor, cause the apparatus to at least:
receive a request for a primary representation and an alternative representation for a segment, wherein the request comprises at least a uniform resource indicator of the primary representation for the segment and a uniform resource indicator of the alternative representation for the segment, wherein the request comprises a template that specifies the alternate representation uniform resource indicator for the segment, wherein the template comprises an indication to accept the alternative representation of the segment, wherein a connection header field is configured to provide an indication that in an instance in which the proxy cache apparatus forwards the request, the proxy cache apparatus is configured to remove the uniform resource indicator of the alternative representation:
determine whether the request comprises an indication that a streaming client apparatus will accept the alternative representation of the segment;
cause a list and range of uniform resource indicators for a selectable cached alternative representation for agent driven content negotiation to be transmitted; and
receive a request for a resource of the selectable cached alternative representation for agent driven content negotiation.

34. An apparatus according to claim 33, wherein the at least one memory including the computer program code is further configured to, with the at least one processor, cause the apparatus to:
determine whether at least one of a primary uniform resource indicator associated with the primary representation is cached; and
cause the primary representation of the segment to be transmitted in an instance in which the primary uniform resource indicator is cached.

35. An apparatus according to claim 33, wherein the at least one memory including the computer program code is further configured to, with the at least one processor, cause the apparatus to:

cause one or more selectable cached alternative representations to be transmitted; and receive a request for at least one of the one or more selectable cached alternative representations.

36. An apparatus according to claim 33, wherein the at least one memory including the computer program code is further configured to, with the at least one processor, cause the apparatus to:

receive a template that specifies a secondary uniform resource indicator for an alternative representation for the segment to be created, wherein the template comprises an indication to accept secondary representation of the segment;

cause the template to be parsed; and determine at least one alternative representation that is associated with the secondary uniform resource indicator in a received template.

* * * * *

UNITED STATES PATENT AND TRADEMARK OFFICE
CERTIFICATE OF CORRECTION

PATENT NO.      : 8,977,704 B2
APPLICATION NO. : 13/340123
DATED           : March 10, 2015
INVENTOR(S)     : Liu et al.

It is certified that error appears in the above-identified patent and that said Letters Patent is hereby corrected as shown below:

In the claims:

Column 40,
Line 37, "alternative representation; and" should read --alternative representation;--;
Line 38, "receiving a list or range of uniform request indicators" should read
--receiving a list or a range of uniform resource indicators--.

Column 41,
Line 24, "receive a list or range of uniform request indicators" should read
--receive a list or a range of uniform resource indicators--.

Signed and Sealed this
Fifteenth Day of December, 2015

Michelle K. Lee
*Director of the United States Patent and Trademark Office*